US007246129B2

(12) United States Patent
Lawrence et al.

(10) Patent No.: US 7,246,129 B2
(45) Date of Patent: Jul. 17, 2007

(54) SYSTEM AND METHOD FOR IDENTIFYING RELATIONSHIPS BETWEEN DATABASE RECORDS

(76) Inventors: P. Nick Lawrence, 1645 Summer La., Roanoke, TX (US) 76262; Kenneth W. Loafman, 2320 Daybreak Trail, Plano, TX (US) 75093; Stephen A. Benno, 8201 Towne Main Dr., Apt. 1128, Plano, TX (US) 75024

( * ) Notice: Subject to any disclaimer, the term of this patent is extended or adjusted under 35 U.S.C. 154(b) by 0 days.

(21) Appl. No.: 11/195,158

(22) Filed: Aug. 1, 2005

(65) Prior Publication Data

US 2006/0010144 A1 Jan. 12, 2006

Related U.S. Application Data

(62) Division of application No. 10/081,620, filed on Feb. 20, 2002, now Pat. No. 7,031,969.

(51) Int. Cl.
*G06F 17/30* (2006.01)

(52) U.S. Cl. .................................................. 707/100

(58) Field of Classification Search .................... 707/1, 707/2, 9, 10, 200; 709/224; 704/9
See application file for complete search history.

(56) References Cited

U.S. PATENT DOCUMENTS

| | | | |
|---|---|---|---|
| 4,625,242 A | 11/1986 | Baumberg | 358/209 |
| 4,811,199 A | 3/1989 | Kuechler et al. | 364/200 |
| 4,945,421 A | 7/1990 | Baumberg | 358/217 |
| 4,972,363 A | 11/1990 | Nguyen et al. | 364/807 |
| 5,093,900 A | 3/1992 | Graf | 395/24 |
| 5,136,686 A | 8/1992 | Koza | 395/13 |
| 5,175,817 A | 12/1992 | Adams et al. | 395/200 |
| 5,208,900 A | 5/1993 | Gardner | 395/27 |
| 5,237,678 A | 8/1993 | Kuechler et al. | 395/600 |
| 5,268,834 A | 12/1993 | Sanner et al. | 364/151 |
| 5,325,091 A | 6/1994 | Kaplan et al. | 341/51 |
| 5,371,834 A | 12/1994 | Tawel | 395/23 |
| 5,386,558 A | 1/1995 | Maudlin et al. | 395/600 |
| 5,438,646 A | 8/1995 | Davidian | 706/41 |
| 5,446,681 A | 8/1995 | Gethner et al. | 702/27 |

(Continued)

FOREIGN PATENT DOCUMENTS

EP 0 378 115 A2 7/1990

(Continued)

OTHER PUBLICATIONS

"XP-002111789" paper from internet at www.lt.com, Lawrence Technologies, 1996 (2 pages).

(Continued)

*Primary Examiner*—Etienne P. LeRoux

(57) ABSTRACT

A system for identifying relationships between database records includes a memory operable to store a plurality of records comprising a first record and at least one second record. Each record comprises at least one of a plurality of tokens. The system also includes one or more processors collectively operable to determine a weight associated with each of the tokens, compare at least one second record to the first record, and determine at least one relationship indicator based on the comparison and at least one of the weights. The at least one relationship indicator identifies a level of relationship between the first record and at least one second record.

32 Claims, 12 Drawing Sheets

U.S. PATENT DOCUMENTS

| | | | |
|---|---|---|---|
| 5,551,027 A | 8/1996 | Choy et al. | 395/600 |
| 5,675,786 A | 10/1997 | McKee et al. | 395/614 |
| 5,675,819 A | 10/1997 | Schuetze | 704/10 |
| 5,680,475 A | 10/1997 | Zwierski et al. | 382/156 |
| 5,752,019 A | 5/1998 | Rigoutsos et al. | 395/603 |
| 5,799,301 A | 8/1998 | Castelli et al. | 707/6 |
| 5,822,741 A | 10/1998 | Fischthal | 706/16 |
| 5,864,848 A | 1/1999 | Horvitz et al. | 707/6 |
| 5,918,232 A | 6/1999 | Pouschine et al. | 707/103 |
| 5,930,789 A | 7/1999 | Agrawal et al. | 707/6 |
| 5,930,803 A | 7/1999 | Becker et al. | 707/104 |
| 5,940,825 A | 8/1999 | Castelli et al. | 706/6 |
| 5,960,194 A | 9/1999 | Choy et al. | 395/613 |
| 5,983,224 A | 11/1999 | Singh et al. | 707/6 |
| 6,009,424 A | 12/1999 | Lepage et al. | 707/6 |
| 6,026,397 A | 2/2000 | Sheppard | 707/5 |
| 6,044,366 A | 3/2000 | Graffe et al. | 707/2 |
| 6,081,774 A | 6/2000 | de Hita et al. | 704/9 |
| 6,085,226 A | 7/2000 | Horvitz | 709/203 |
| 6,134,555 A | 10/2000 | Chadha et al. | 707/102 |
| 6,167,391 A | 12/2000 | Lawrence | 706/26 |
| 6,236,985 B1 | 5/2001 | Aggarwal et al. | 707/2 |
| 6,246,977 B1 * | 6/2001 | Messerly et al. | 704/9 |
| 6,263,334 B1 | 7/2001 | Fayyad et al. | 707/5 |
| 6,263,337 B1 | 7/2001 | Fayyad et al. | 707/6 |
| 6,269,376 B1 | 7/2001 | Dhillon et al. | 707/101 |
| 6,553,365 B1 | 4/2003 | Summerlin et al. | 707/2 |

FOREIGN PATENT DOCUMENTS

| | | |
|---|---|---|
| GB | 2 206 428 A | 1/1989 |
| WO | WO 93/14459 | 7/1993 |

OTHER PUBLICATIONS

"XP-002111790" paper from internet at www.lt.com, Lawrence Technologies, 1996 (3 pages).

International Search Report for International Application No. PCT/US 99/06028, Mailed Aug. 24, 1999.

"The Corob Model: A New Computational Paradigm," Lawrence Technologies. (21 pages), Jun. 10, 1998.

"Corobs and Neurophysiology: A White Paper," Lawrence Technologies. (15 pages), May 26, 1998.

U.S. Appl. No. 09/938,948, "System and Methods for Generating String Correlithm Objects," filed by P. Nick Lawrence, Aug. 23, 2001.

C.T. Yu et al., "Adaptive Record Clustering," ACM Transactions on Database Systems, vol. 10, No. 2, pp. 180-204, Jun. 1985.

Autonomy Technology White Paper, 2001.

Autonomy web site, "Intellectual Foundations," http://www.autonomy.com/autonomy_v3/Content/Technology/Background/IntellectualFoundations, 2 pages.

* cited by examiner

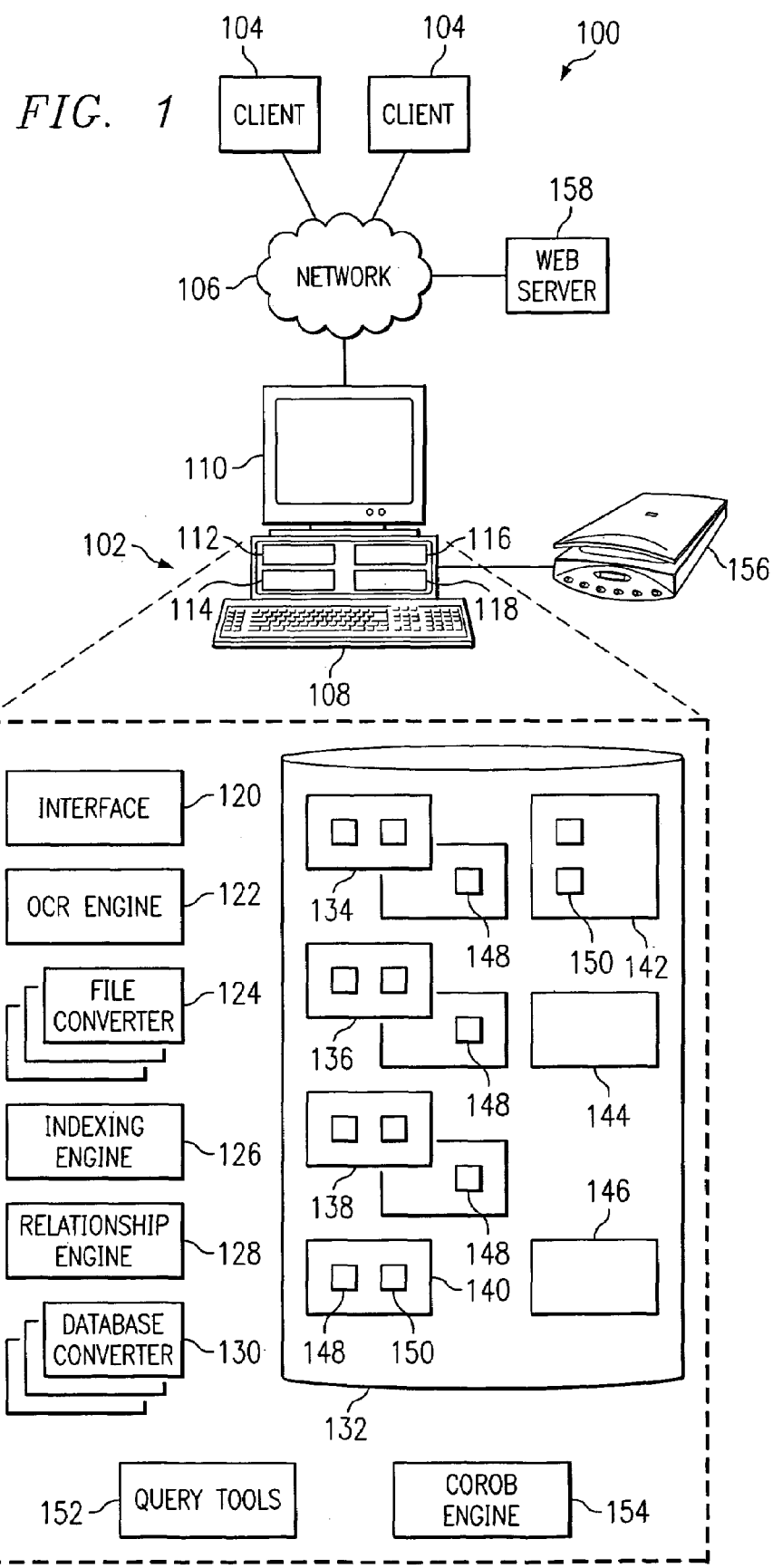

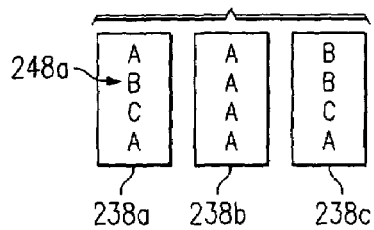
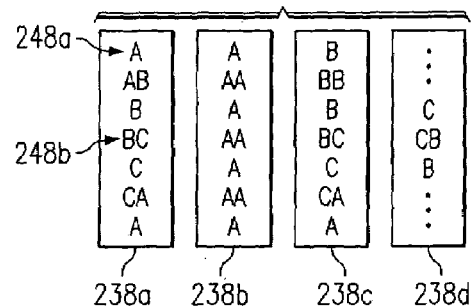

*FIG. 3* 340

| TOKEN INDEX | TOKEN | COUNT | WEIGHT |
|---|---|---|---|
| 1 | A | 7 | 1.58 |
| 2 | AA | 3 | 2.81 |
| 3 | AB | 1 | 4.39 |
| 4 | B | 3 | 2.81 |
| 5 | BB | 1 | 4.39 |
| 6 | BC | 2 | 3.39 |
| 7 | C | 2 | 3.39 |
| 8 | CA | 2 | 3.39 |

| ENTRY INDEX | TOKEN INDEX | COUNT |
|---|---|---|
| 1 | 1 | 2 |
| 2 | 3 | 1 |
| 3 | 4 | 1 |
| 4 | 6 | 1 |
| 5 | 7 | 1 |
| 6 | 8 | 1 |
| 7 | 1 | 4 |
| 8 | 2 | 3 |
| 9 | 1 | 1 |
| 10 | 4 | 2 |
| 11 | 5 | 1 |
| 12 | 6 | 1 |
| 13 | 7 | 1 |
| 14 | 8 | 1 |

| RECORD INDEX | RECORDS TABLE ENTRY | RECORD SCORE |
|---|---|---|
| 1 | 1 | 20.95 |
| 2 | 7 | 14.75 |
| 3 | 9 | 21.76 |

592 482 594

590

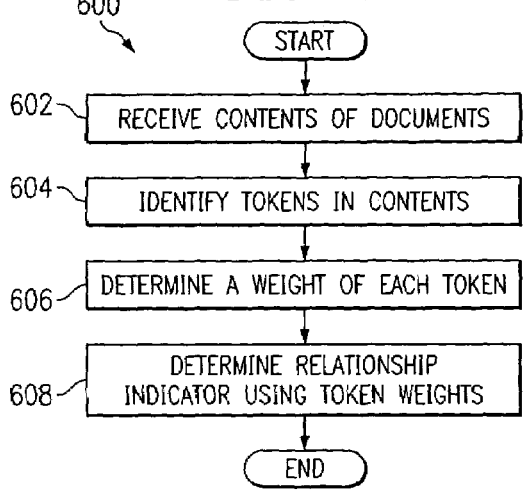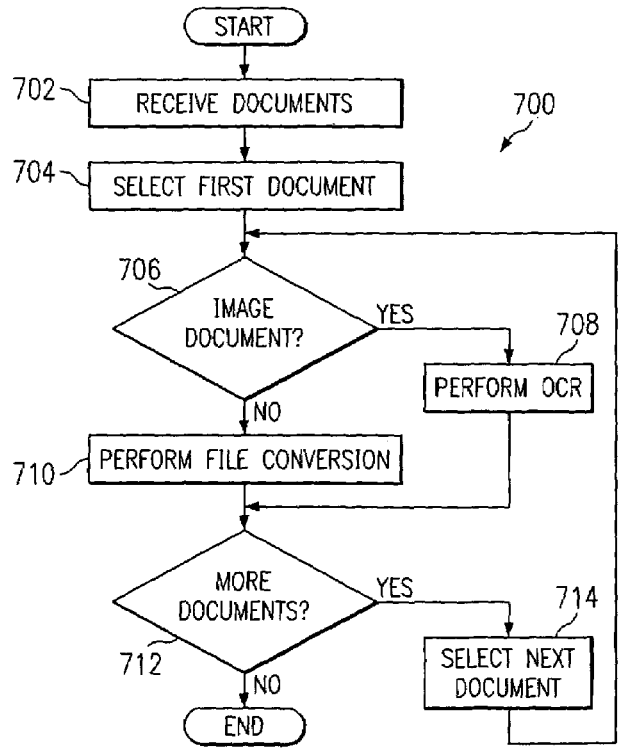

FIG. 12

| TOKEN | TOKEN REPRESENTATION | COUNT |
|---|---|---|
| A | $X_1, X_2, ..., X_{N_1}$    $U_1, U_2, ..., U_{N_1}$ | 41 |
| B | $Y_1, Y_2, ..., Y_{N_2}$    $V_1, V_2, ..., V_{N_2}$ | 66 |
| C | $Z_1, Z_2, ..., Z_{N_3}$    $W_1, W_2, ..., W_{N_3}$ | 134 |

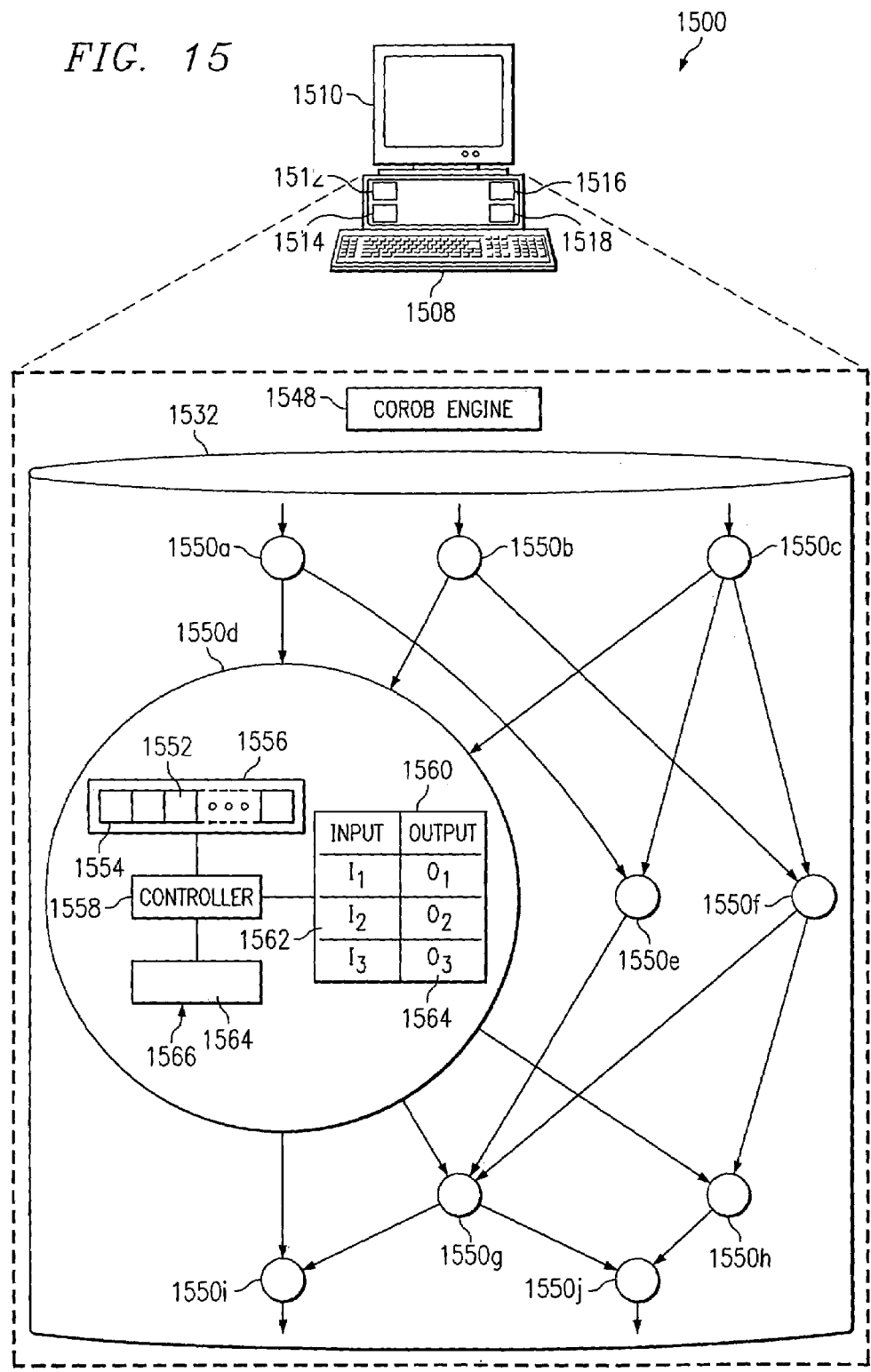

SYSTEM AND METHOD FOR IDENTIFYING RELATIONSHIPS BETWEEN DATABASE RECORDS

CROSS REFERENCE TO RELATED APPLICATIONS

This application is a divisional of U.S. application Ser. No. 10/081,620, filed Feb. 20, 2002 now U.S. Pat. No. 7,031,969 by P. Nick Lawrence et al. and entitled "System and Method for Identifying Relationships Between Database Records".

TECHNICAL FIELD

This invention relates generally to the field of computing systems, and more particularly to a system and method for identifying relationships between database records.

BACKGROUND

Businesses and other organizations often typically generate large amounts of information. As particular examples, an engineering firm may have a large number of employees that generate written specifications, and a hospital could produce a large number of patient files. These and other organizations may also attempt to process and organize large amounts of information. As another particular example, a law firm may handle a lawsuit that involves tens or hundreds of thousands of pages of documents, which often must be reviewed manually at great expense.

After the documents have been processed, to locate documents that may be related to one another, a user typically submits a Boolean query to a database containing those documents. The query typically lists one or more keywords that the user wishes to locate, and the user typically receives every document from the database having those keywords. The use of these queries typically results in the user receiving a large number of documents that are unrelated to one another or that are unrelated to a topic needed by the user.

SUMMARY

The present invention recognizes a need for an improved system and method for identifying relationships between database records, which reduce or eliminate at least some of the problems and disadvantages associated with prior systems and methods.

In one aspect of the invention, a system for identifying relationships between database records includes a memory operable to store a plurality of records comprising a first record and at least one second record. Each record comprises at least one of a plurality of tokens. The system also includes one or more processors collectively operable to determine a weight associated with each of the tokens, compare at least one second record to the first record, and determine at least one relationship indicator based on the comparison and at least one of the weights. The at least one relationship indicator identifies a level of relationship between the first record and at least one second record.

Numerous technical advantages are provided according to various embodiments of the present invention. Particular embodiments of the invention may exhibit none, some, or all of the following advantages depending on the implementation. For example, in one embodiment, a system for identifying relationships between database records is provided. In particular, the system may identify one or more "tokens" of information in a record. The token may represent a word, a group of words, a date, a name, or any other suitable information from one or more documents. The system may then determine a "weight" or importance of each token and use the weights to identify relationships between records. In this way, the system may identify related records using the tokens contained in those records. This may allow the user to more quickly find related records because the user may not be required to enter database queries with numerous keywords. This may also allow the system to more accurately identify related records because the user is not required to pick the proper keywords for the database query.

Another advantage of at least some embodiments of the invention is that the system may be able to locate missing parts of a document. For example, a user may locate a document that appears incomplete, and the system may identify the database record associated with the incomplete document. The system may also locate records that are related to the identified record, such as any record that is related within a particular degree to the identified record. The user may then review the related record or records and attempt to locate the missing portion of the document.

In addition, at least some embodiments of the invention support the use of correlithm objects ("corobs") to represent the tokens contained in the database records. In general, a corob may represent a point in space, and one corob may be separated from another corob by a distance. The system may use corobs and the distances between corobs to imitate the behavior of living information processing systems such as humans. The use of corobs may allow the system to imitate the behavior of neurons, which may allow the system to imitate the behavior of living information processing systems more effectively. In addition, the corobs may have the ability to efficiently represent data in the system even when large amounts of noise or error exist in the system, which also may allow the system to operate more effectively.

Other technical advantages are readily apparent to one of skill in the art from the attached figures, description, and claims.

BRIEF DESCRIPTION OF THE DRAWINGS

To provide a more complete understanding of the present invention and features and advantages thereof, reference is made to the following description in conjunction with the accompanying drawings, in which:

FIG. 1 is a block diagram illustrating an example system for identifying relationships between database records;

FIGS. 2A through 2D are block diagrams illustrating example records;

FIG. 3 is a block diagram illustrating an example token table;

FIG. 4 is a block diagram illustrating an example records table;

FIG. 5 is a block diagram illustrating an example records table index;

FIG. 6 is a flow diagram illustrating an example method for identifying relationships between database records;

FIG. 7 is a flow diagram illustrating an example method for generating text files;

FIG. 12 is a block diagram illustrating an example token table using correlithm objects to represent tokens;

FIG. 15 is a block diagram illustrating another example system for identifying relationships between database records.

DETAILED DESCRIPTION OF EXAMPLE EMBODIMENTS

Figure 8:
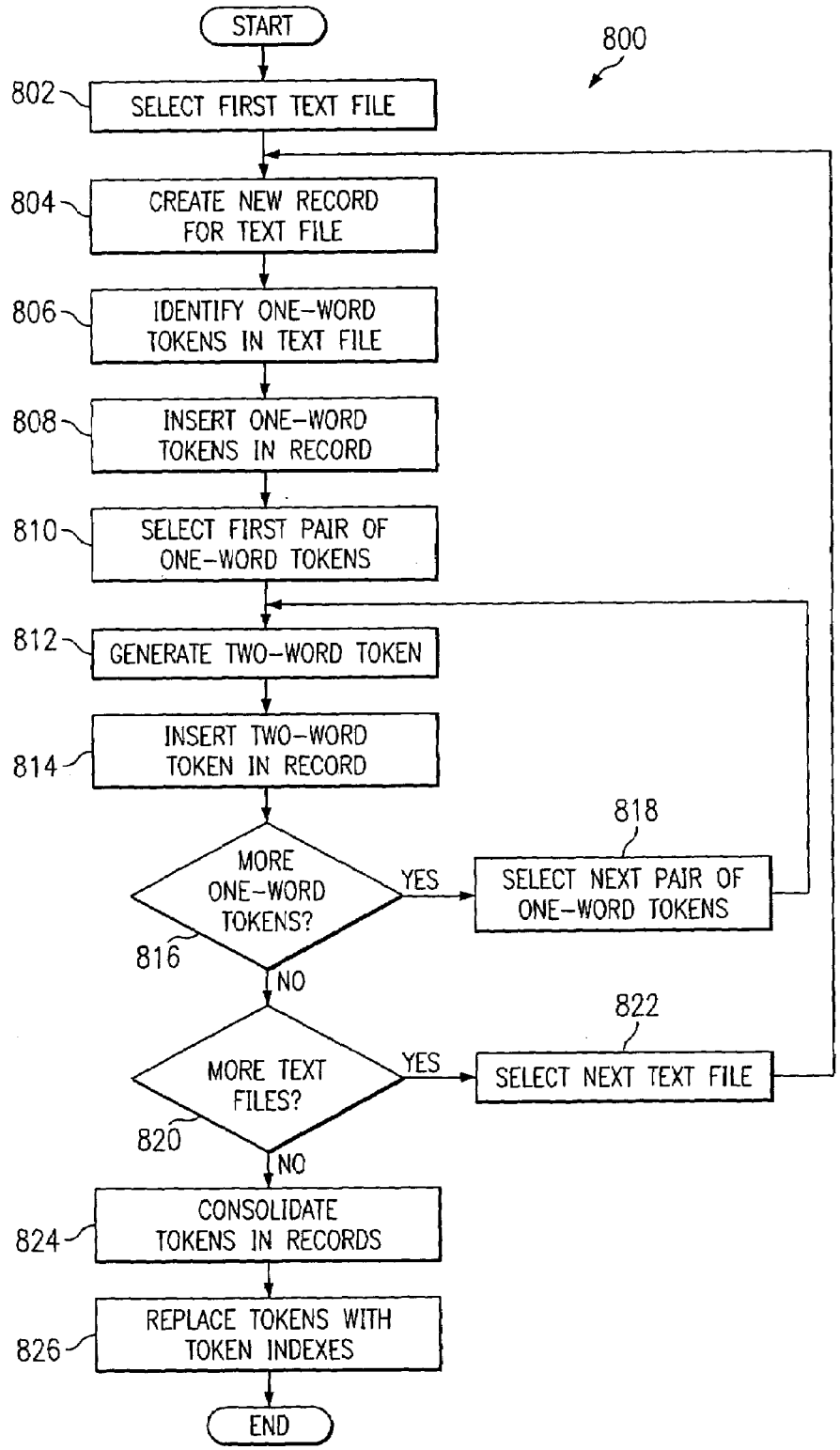
FIG. 8 is a flow diagram illustrating an example method for generating records.

FIG. 1 is a block diagram illustrating an example system 100 for identifying relationships between database records. In the illustrated embodiment, system 100 includes one or more host computers 102, one or more clients 104, and a network 106. Other embodiments of system 100 may be used without departing from the scope of the present invention.

In one aspect of operation, system 100 may examine a document 134 and identify one or more tokens 148 in the document 134. System 100 may also generate one or more records 138. A record 138 may be associated with one or more documents 134 and contain or otherwise identify the tokens 148 in those documents 134. System 100 may further identify a weight or "importance" of each token 148. In addition, system 100 may use the weights of tokens 148 to identify relationships between records 138 and, as a result, relationships between the documents 134 associated with records 138. In this manner, system 100 may identify one or more records 138 that are related to one another based, at least partially, on the contents of the documents 134 associated with records 138.

Host 102 processes documents 134 and/or other information to identify tokens 148 and identify relationships between documents 134. In this specification, the term "document" may refer to physical pages of text, electronic images of physical pages of text or other images, electronic word processing and spreadsheet files, electronic mail messages, web pages, audio information, video information, and/or any other medium containing informational content, whether in physical or electronic form. Also, in this specification, the term "record" may refer to any data structure, compilation, and/or arrangement used to store information. A record may store text strings, numerical values, images, signals, and/or any other suitable information. Further, in this specification, the term "token" may refer to a word, a group of words, a date, a Bates numbers, a name, a symbol, a character, a group of characters, a correlithm object, part or all of a signal or image, a feature of an image or signal, fields from a database, and any other and/or additional information contained in or representing information contained in a document 134, a record 138, or other file. Host 102 may execute with any of the well-known MS-DOS, PC-DOS, OS-2, MAC-OS, WINDOWS, UNIX, LINUX, or other suitable operating system.

In the illustrated embodiment, host 102 includes a desktop computer, although host 102 could also include a laptop computer, a server computer, and/or any other suitable computing or communicating device or devices. Host 102 may include an input device 108, an output device 110, random access memory (RAM) 112, read-only memory (ROM) 114, a CD-ROM, hard drive, and/or other magnetic, optical, or other storage media 116 or other appropriate volatile or nonvolatile storage and retrieval devices, and one or more processors 118. Input device 108 may, for example, include a keyboard, mouse, graphics tablet, touch screen, pressure-sensitive pad, joy stick, light pen, microphone, or other suitable input device. Output device 110 may, for example, include a video display, a printer, a disk drive, a plotter, a speaker, or other suitable output device. Processor 118 could, for example, include a single processor, multiple processors, a processor array such as an array of field programmable gate arrays, or other suitable processor or processors.

Client 104 may include any computing or communicating device operable to communicate and/or receive information over network 106. Client 104 may, for example, include a desktop computer executing a web browser. Network 106 may include a local area network (LAN), a metropolitan area net (MAN), a wide area network (WAN), all or a portion of the global computer network known as the Internet, and/or any other communications system or systems at one or more locations.

Items within the dashed lines in FIG. 1 represent example functional operation and data organization of the various components of system 100. In the illustrated embodiment, host 102 includes an interface 120, an optical character recognition (OCR) engine 122, one or more file converters 124, an indexing engine 126, a relationship engine 128, one or more database converters 130, and a memory 132. Other embodiments of host 102 may be used without departing from the scope of the present invention.

Interface 120 couples host 102 and network 106. In this specification, the term "couple" may refer to any direct or indirect communication between two or more components, whether or not those components are in physical contact with one another. Interface 120 facilities the communication of information over network 106. For example, interface 120 may allow a client 104 to submit documents 134 to host 102 over network 106. Interface 120 may also allow host 102 to communicate information identifying related records 138 to client 104 over network 106. Interface 120 may include any hardware, software, firmware, or combination thereof operable to facilitate communication over network 106. Interface 120 may, for example, include a Digital Subscriber Line (DSL) interface, a cable modem interface, a network interface card (NIC), an Ethernet interface, or any other suitable interface operable to communicate over network 106.

Optical character recognition engine 122 may process one or more documents 134 and generate at least one text file 136. A text file 136 may contain at least a portion of the text or other content of one or more documents 134. In one embodiment, a document 134 may contain one or more tokens 148, and the text file 136 associated with document 134 may also contain those tokens 148. As a particular example, a document 134 may represent an electronic image of a physical page of text. Optical character recognition engine 122 may analyze the image of the text contained in document 134 and translate the image of the text into ASCII or other characters. A document 134 could also include non-text content, such as images, diagrams, and logos, and optical character recognition engine 122 may or may not place an indicator in text file 136 that the non-text content exists in document 134. In addition, a document 134 could include handwritten text, which optical character recognition engine 122 may or may not convert into text stored in text file 136. Optical character recognition engine 122 may include any hardware, software, firmware, or combination thereof operable to translate document images into a form processable by host 102. Optical character recognition engine 122 may, for example, include the ABBYY FINEREADER 5.0 software package from ABBYY SOFTWARE HOUSE, Moscow, Russia. The software may be stored in host 102 and executed by processor 118.

File converter 124 may also process one or more documents 134 and generate at least one text file 136. For example, in one embodiment, a document 134 may not need to be processed by optical character recognition engine 122. As particular examples, a word processing file or a spreadsheet file may be processed by system 100 without requiring the use of optical character recognition engine 122. For this type of document 134, a file converter 124 may, for example, extract the text contained in the document 134 and place the text in a text file 136. File converter 124 may include any hardware, software, firmware, or combination thereof operable to convert a document 134 to another format. In one embodiment, a file converter 124 includes one or more software routines stored in host 102 and executed by processor 118. In a particular embodiment, one or more file converters 124 may extract information contained in MICROSOFT WORD, COREL WORDPERFECT, MICROSOFT EXCEL, MICROSOFT OUTLOOK, and LOTUS NOTES files.

Indexing engine 126 may process documents 134, text files 136, and/or other information to generate information used to identify relationships between records 138. For example, indexing engine 126 may use documents 134 and/or text files 136 to generate records 138. In one embodiment, each record 138 contains or otherwise identifies the tokens 148 contained in a text file 136. In a particular embodiment, indexing engine 126 examines a text file 136, identifies one or more tokens 148 contained in the text file 136, and stores the identified tokens 148 in a record 138 associated with the text file 136. Example records are shown in FIGS. 2A–2D, which are described below. An example method of generating the records is shown in FIG. 8, which is also described below.

Figure 9:
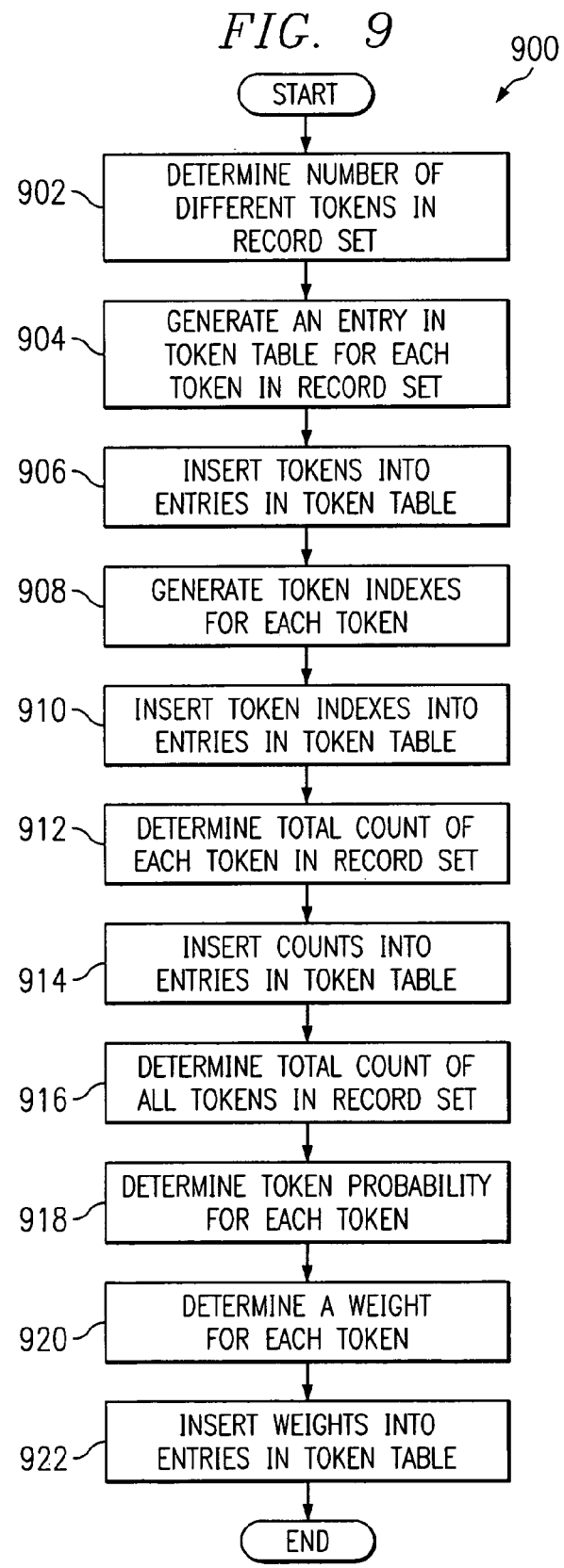
FIG. 9 is a flow diagram illustrating an example method for generating a token table.

Indexing engine 126 may also generate a token table 140. Token table 140 may contain information associated with the various tokens 148 contained in records 138. For example, in one embodiment, token table 140 may identify a token representation 150 associated with each token 148. In this specification, the term "each" may refer to each of at least a subset of the identified items. The token representations 150 could include integers, characters, character strings, and/or any other suitable identifiers identifying tokens 148. In a particular embodiment, token representations 150 include integers that uniquely identify tokens 148 in system 100. Token table 140 may also include a "count" value associated with each token 148. The count value may identify the total number of times that a token 148 appears in a set of records 138. In addition, token table 140 may include a "weight" associated with each token 148. The weight of a token 148 may, for example, identify the importance of the token 148. In a particular embodiment, the weight of a token 148 is inversely proportional to the count of the token 148. In this embodiment, the more that a token 148 appears in a set of records 138, the lower the weight becomes. An example token table is shown in FIG. 3, which is described below. An example method of generating a token table is shown in FIG. 9, which is also described below.

Figure 10:
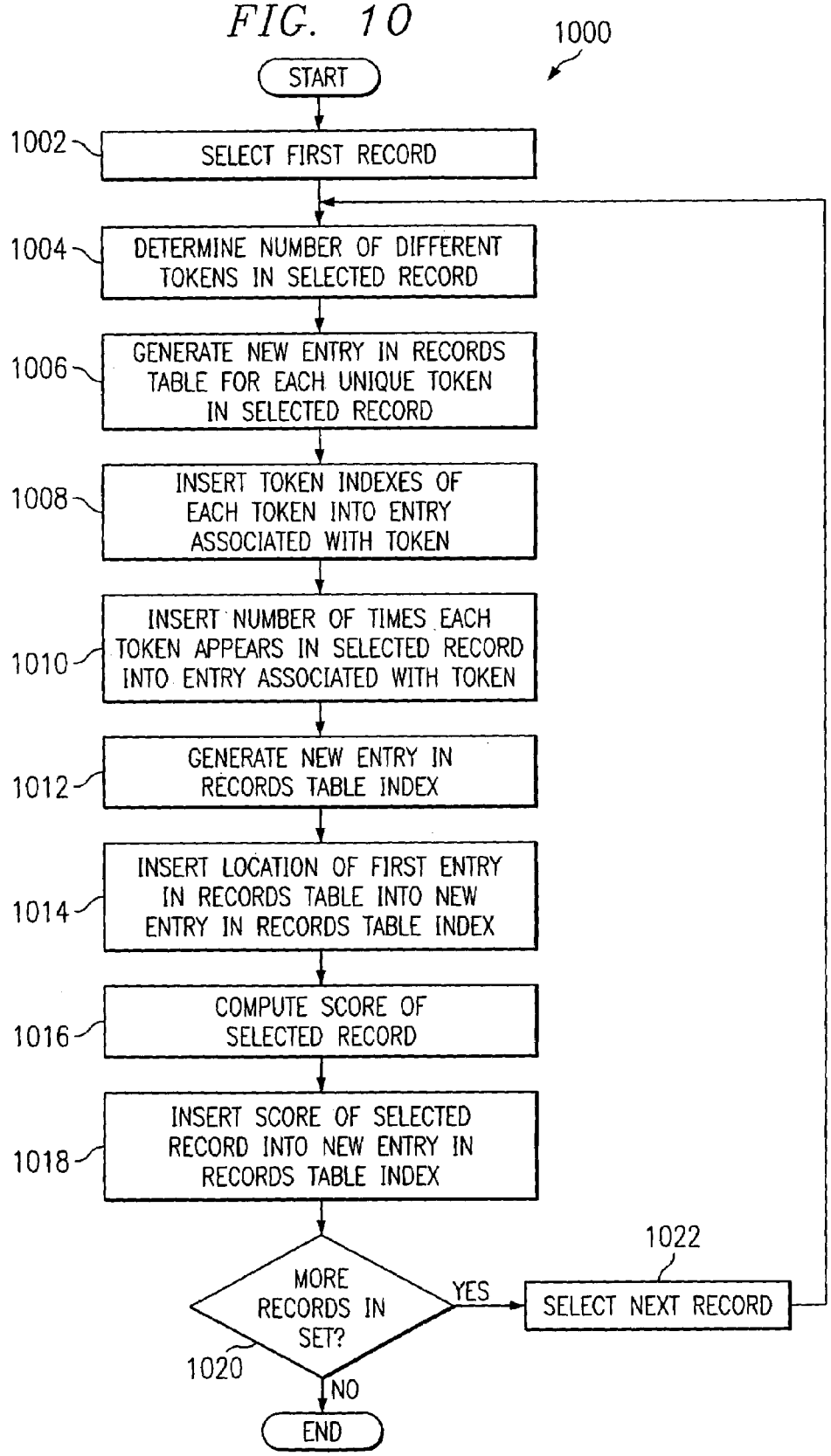
FIG. 10 is a flow diagram illustrating an example method for generating a records table and a records table index.

Indexing engine 126 may further generate a records table 142 and a records table index 144. In one embodiment, records table 142 includes the token representations 150 that identify the tokens 148 contained in each record 138. For example, a record 138 may be associated with one or more entries in records table 142, and each entry may include a token representation 150 identifying a token 148 contained in that record 138. Each entry in records table 142 may also include a count value identifying the number of times that the token 148 appears in the record 138. In one embodiment, records table index 144 stores information identifying where information about each record 138 is stored in records table 142. For example, records table 142 may include one or multiple entries for each record 138, and records table index 144 could identify the first entry associated with each record 138. Records table index 144 may also include a "score" for each record 138. For example, indexing engine 126 may generate a score for a record 138 using the weights assigned to the tokens 148 contained in that record 138. An example records table is shown in FIG. 4, which is described below. An example records table index is shown in FIG. 5, which is also described below. An example method for generating a records table and a records table index is shown in FIG. 10, which is described below.

In addition, indexing engine 126 may generate a category table 146. Category table 146 may identify a document "type" associated with each record 138. For example, category table 146 may indicate that a record 138 is associated with a document 134 that appears to be a facsimile, a letter, a memorandum, or any other suitable document type. In one embodiment, indexing engine 126 may categorize documents 134 by comparing the tokens 148 and/or token representations 150 in records 138 or records table 142 with a list of tokens associated with each document type. For example, to determine if a document 134 is a letter, indexing engine 126 may determine whether the tokens 148 appearing at the beginning of a record 138 associated with document 134 include keywords such as "To," "From," "Sent," "Regarding," and "Subject." These keywords could indicate that the document 134 might be a letter. The location of the keywords in the document 134 may help to determine the document type of the document 134. For example, the keyword "Report" might be more significant if it appears at the top of a document 134, rather than in the body of the document 134. In a particular embodiment, a document type can have one or more document subtypes. As a particular example, indexing engine 126 could break down the "letter" document type into subtypes, such as "reports," "financial information," and/or "attorney-client communications." Indexing engine 126 may use any suitable method for categorizing documents 134. In one embodiment, indexing engine 126 uses a decision tree, such as a sieve decision tree, to categorize the documents 134. In this embodiment, indexing engine 126 may use various rules embodied in the decision tree to classify documents 134 into different categories, and the hierarchy of the tree defines how the rules are applied to the documents 134. If indexing engine 126 is unable to categorize a document 134, category table 146 could include a default document type, such as "unidentified."

Indexing engine 126 may include any hardware, software, firmware, or combination thereof operable to identify and index tokens 148. In one embodiment, indexing engine 126 includes one or more software routines stored in host 102 and executed by processor 118. Although indexing engine 126 has been described as generating records 138, token table 140, records table 142, records table index 144, and category table 146, indexing engine 126 could generate any other and/or additional information without departing from the scope of the present invention. For example, in a particular embodiment, indexing engine 126 may not generate category table 146. Also, while indexing engine 126 has been described as generating "tables" of information, any other suitable data structure, compilation, and/or arrangement may be used to store the information.

Figure 11:
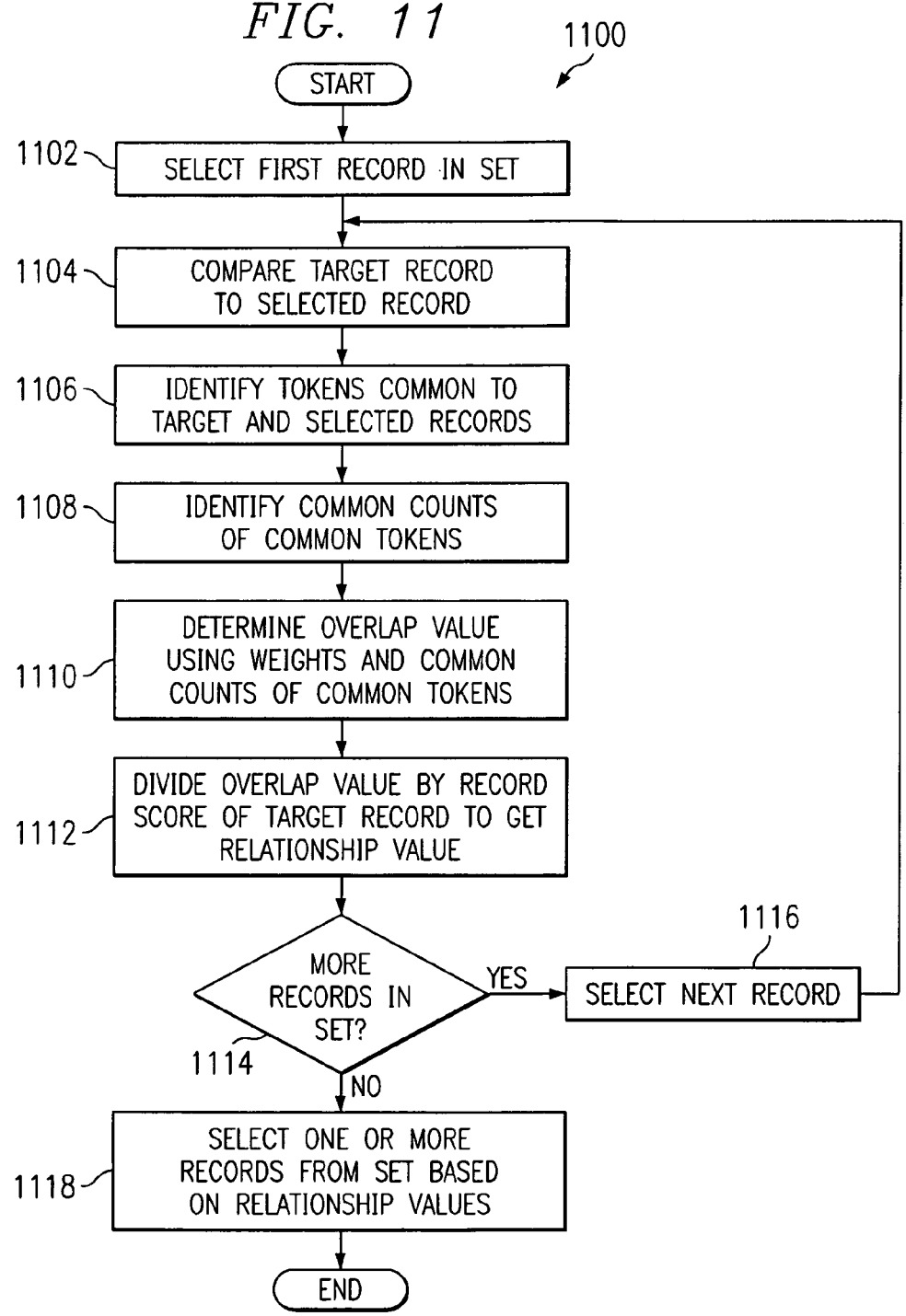
FIG. 11 is a flow diagram illustrating an example method for determining relationship indicators between a target record and records in a record set.

Relationship engine 128 may process documents 134, text files 136, records 138, records table 142, records table index 144, and/or other information to identify relationships between records 138. In one embodiment, relationship engine 128 identifies potential relationships between records 138 using the token weights from token table 140, the token representations 150 from records table 142, and the record scores from records table index 144. For example, relationship engine 128 may use records table 142 to compare the contents of a first record 138 (called a "target" record 138) to the contents of one or more second records 138 (called "selected" records 138) and generate a relationship indicator for each of the selected records 138. The relationship indicator may represents the level or degree to which two records 138 may be related. In a particular embodiment, the relationship indicator may have a value between 0.0 and 1.0 inclusive. A relationship indicator of 1.0 would indicate an exact match, where both records 138 contain the same tokens 148 and those tokens 148 appear the same number of times in records 138. A relationship indicator of 0.0 would indicate that two records 138 contain different tokens 148. A relationship indicator of between 0.0 and 1.0 could represent varying degrees of relationship between two records 138. An example of a method for determining relationship indicators between a target record and selected records is shown in FIG. 11, which is described below.

Relationship engine 128 may compare a target record 138 to any number of selected records 138. For example, a user could select one, some, or all of the documents 134 in memory 132, and relationship engine 128 may compare the target record 138 to all of the records 138 associated with the selected documents 134. In this way, a user may control which records 138 are compared to a target record 138. The user may also submit a document 134 to host 102, and relationship engine 128 may process the new document 134, generate a new record 138, and use the new record 138 as the target record. As an example, the user may wish to know whether a document having particular content exists in a large set of documents 134. In this situation, the user could generate a "synthetic document," or a document produced by the user. The user could generate a synthetic document, for example, by typing a new document containing the desired content or by "cutting and pasting" information from one or more existing documents 134. The user could then submit the synthetic document to host 102, and host 102 uses the synthetic document to generate the target record 138.

After comparing one or more selected records 138 to a target record 138, relationship engine 128 may output the results of the comparison to the user. The information provided to the user may vary depending on particular needs. For example, relationship engine 128 could provide the user with the relationship indicator for every record 138 in system 100. Relationship engine 128 could also provide the user with the identity of any records 138 having a relationship indicator that exceeds a specified value. Relationship engine 128 could further sort the records 138 by relationship indicator and present the user with a list of records 138 in order of decreasing or increasing relationship indicators. In a particular embodiment, such as when the user is using a web browser to access host 102, relationship engine 128 may further generate a web page containing the results. The web page could include links that the user may select to view documents 134.

Relationship engine 128 may include any hardware, software, firmware, or combination thereof operable to determine the level or degree of relationship between data in system 100. For example, relationship engine 128 may include one or more software routines stored in host 102 and executed by processor 118. Although relationship engine 128 has been described as using records table 142 to determine the relationship indicators, relationship engine 128 could also use the information stored in records 138 and/or any other suitable information to determine the relationship indicators.

Database converter 130 may convert some or all of the information in memory 132 into a format suitable for use by another program or database. For example, some or all of the information received, processed, and/or generated by host 102 may be provided to one or more persons or entities. As a particular example, the documents 134 processed by system 100 may represent documents used in a lawsuit, and a law firm handling the lawsuit may wish to obtain some or all of the information in memory 132 for use in a litigation support tool. The litigation support tool may include CONCORDANCE by DATA FLIGHT SOFTWARE, INC. or SUMMATION by SUMMATION LEGAL TECHNOLOGIES, INC. Database converter 130 may retrieve at least a portion of the information contained in memory 132 and reformat the information for use in another system. For example, one database converter 130 may convert the information in memory 132 into a format suitable for use with the CONCORDANCE litigation tool, and another database converter 130 could convert the information in memory 132 into a format suitable for use in the SUMMATION litigation tool. Any other and/or additional database converters 130 may be used to convert at least a portion of the information in memory 132 into a suitable format for use with any other database, system, software, or other environment.

In one embodiment, host 102 may also include one or more query tools 152. Query tools 152 may allow a user to execute different queries on the information contained in memory 132. For example, a query tool 152 may search records 138, identify records 138 containing one or more keywords provided by a user, and return a list of documents 134 associated with records 138 containing the keywords. Another query tool 152 may locate any records 138 containing a date within a date range supplied by the user, identify the documents 134 associated with those records 138, and provide a list of the documents 134 to the user. In addition, documents 134 may include unique identifiers, such as a BATES number, which may be extracted as tokens 148 from documents 134. Another query tool 152 may receive a BATES number or a range of BATES numbers from a user, access records 138, identify any records 138 containing the specified BATES number or a BATES number falling within the range of BATES numbers, and return a list of the documents 134 associated with the identified records 138. Any other and/or additional query tools 152 may be used in system 100 without departing from the scope of the present invention. Query tool 152 may include any hardware, software, firmware, or combination thereof operable to query memory 132. In one embodiment, query tools 152 may include one or more software routines stored in host 102 and executed by processor 118.

In one embodiment, host 102 may also include a corelithm object ("corob") engine 154. In this embodiment, system 100 may generate and manipulate corobs, and the corobs may be used to represent the tokens 148, the weights assigned to tokens 148, the counts associated with tokens 148, and/or any other suitable information. As described below with respect to FIGS. 12–14, a corob may represent a point in space, and one corob may be separated from another corob by a distance. The distance between two corobs may provide information identifying possible relationships between the corobs. As a particular example, corobs separated by a smaller distance may be more related than corobs separated by a larger distance. In one embodiment, corob engine 154 supports the use of corobs in host 102. For example, corob engine 154 could support one or more algorithms for creating, processing, and manipulating the corobs. As particular examples, corob engine 154 could support one or more algorithms for creating corobs and for determining the distance between corobs. Corob engine 154 may include any hardware, software, firmware, or combination thereof operable to support the use of corobs in system 100. Corob engine 154 may, for example, include software routines executing on processor 118 of host 102.

Memory 132 stores information used by one or more components of host 102. Memory 132 may, for example, store documents 134, text files 136, records 138, token table 140, records table 142, records table index 144, and/or category table 146. Memory 132 may also facilitate retrieval of this and/or other information for use by the various components of host 102. Memory 132 may include any hardware, software, firmware, or combination thereof operable to store and facilitate retrieval of information. Memory 132 may store information using any of a variety of data structures, arrangements, and/or compilations. Memory 132 may, for example, include a dynamic random access memory (DRAM), a static random access memory (SRAM), or any other suitable volatile or nonvolatile storage and retrieval device or combination of devices. Although FIG. 1 illustrates memory 132 as residing within host 102, memory 132 may reside at any location that is accessible by host 102.

Although FIG. 1 illustrates one embodiment of system 100, various changes may be made to system 100 without departing from the scope of the present invention. For example, system 100 may include any number of hosts 102 and/or clients 104. Also, the contents of documents 134 could be extracted using methods other than optical character recognition and file conversion, and host 102 could store the contents of documents 134 in files other than text files 136. Further, while various components in system 100 have been described as receiving and processing specific information, these components may receive and/or process other suitable information without departing from the scope of the present invention. As an example, while indexing engine 126 may be described in this specification as processing text files 136, indexing engine 126 could also process documents 134 without requiring intermediate storage of the document contents in text files 136. As another example, indexing engine 126 could receive text files 136 and/or other files containing the contents of documents 134 without actually receiving the documents 134.

In addition, the functional divisions of host 102 are for illustration only. Various functional components of host 102 could be combined with one another or removed from host 102, depending on particular needs, without departing from the scope of the present invention. As particular examples, optical character recognition engine 122, file converters 124, and/or database converters 130 may not be needed in host 102, depending on the format of the information received or transmitted by host 102. As another example, FIG. 1 illustrates host 102 including both indexing engine 126 and relationship engine 128. In another embodiment, all or a portion of the information contained in memory 132 may be stored in or otherwise made available to another element in system 100, such as a web server 158. In this embodiment, relationship engine 128 and query tools 152 may reside on web server 158, and clients 104 may access web server 158 through network 106. In this embodiment, clients 104 may use relationship engine 128 and/or query tools 152 on web server 158 to search the information generated by host 102. This may allow, for example, host 102 to index documents 134, while web server 158 stores and uses the results of the indexing. In a particular embodiment, web server 158 may pre-load or cache token table 140, records table 142, records table index 144, and/or any other information into memory, which may help increase the speed at which web server 158 processes the information. Other changes may be made to system 100 without departing from the scope of the present invention.

FIGS. 2A through 2D are block diagrams illustrating example database records 238. Records 238 may be useful, for example, as records 138 in system 100 of FIG. 1. Records 238 illustrated in FIGS. 2A through 2D are for illustration only. Any other suitable records containing any suitable information may be used without departing from the scope of the present invention.

FIG. 2A illustrates three data records 238a–238c containing one-word tokens 248a. As shown in the example in FIG. 2A, each record 238 includes four tokens 248a, although each record 238 could include any suitable number of tokens 248a. Each one-word token 248a may represent a word contained in a document, such as document 134 of system 100. As shown in FIG. 2A, record 238a includes three different one-word tokens 248a, record 238b includes four instances of the same one-word token 248a, and record 238c includes two instances of two different one-word tokens 248a.

Indexing engine 126 may use any suitable procedure or method for generating records 238. In one embodiment, indexing engine 126 uses a list of predefined tokens 248a to examine a text file 136 and determine if any of the predefined tokens 248a exist in the text file 136. If a predefined token 248a is located in a text file 136, that token 248a is inserted into a record 238. The predefined tokens 248a may be specified by the entity operating host 102, a customer of the entity operating host 102, or any other suitable person or entity.

In another embodiment, indexing engine 126 may examine a text file 136 and treat each word contained in text file 136 as a token 248a. Each token 248a may then be inserted into a record 238. In a particular embodiment, indexing engine 126 could ignore certain words and/or symbols in a text file 136. A "stop word" may represent a word that may be ignored due to the large number of occurrences of the word. For example, words such as "a," "an," "the," and "of" and punctuation marks may be too common to provide any useful information in system 100, and indexing engine 126 could ignore these and/or other stop words. As a particular example, if a text file 136 contains the phrase "The quick brown foxes run home!", indexing engine 126 may generate a record 238 containing the tokens "quick," "brown," "foxes," "run," and "home."

As shown in FIG. 2B, indexing engine 126 may process records 238a–238c and identify multiple-word tokens 248b using the one-word tokens 248a. In the illustrated embodiment, indexing engine 126 generates the multiple-word tokens 248b by combining two consecutive one-word tokens 248a in a record 238. As shown in FIG. 2B, each multiple-word token 248*b* lies between two one-word tokens 248*a*, and each multiple-word token 248*b* represents a combination of the two one-word tokens 248*a* that occur before and after the multiple-word token 248*b*. Returning to the above example, a record 238 may contain one-word tokens "quick," "brown," "foxes," "run," and "home." Indexing engine 126 may generate two-word tokens 248*b* by combining consecutive one-word tokens 248*a*, which produces the tokens "quick brown," "brown foxes," "foxes run," and "run home."

In the illustrated embodiment, the use of multiple-word tokens 248*b* may allow system 100 to determine that the two-word token "BC" appears twice in records 238*a*–238*c*, while the two-word token "CB" does not occur in records 238*a*–238*c*. If a fourth record 238*d* was found to contain the one-word tokens "C" and "B" and the two-word token "CB," the new record 238*d* might be somewhat related to record 238*a* and/or record 238*c* because records 238*a* and 238*c* contain the "B" and "C" tokens 248. However, records 238*a* and 238*c* might not be as related to the new record 238*d* as to another record that contains the "C" and "B" tokens 248 in the same order as record 238*d*. As a result, system 100 may at least partially consider the ordering of the one-word tokens 248*a* when identifying relationships between records 238. This may also allow system 100 to differentiate between phrases such as "run home" and "home run."

This illustrates one example method of generating multiple-word tokens 248*b*. Indexing engine 126 may use any other suitable method to generate multiple-word tokens 248*b*, whether or not that method relies on combining one-word tokens 248*a*. Also, while FIG. 2B illustrates indexing engine 126 generating two-word tokens 248*b*, the same or similar method can be used by indexing engine 126 to generate tokens 248 having more than two words.

As shown in FIG. 2C, indexing engine 126 may further process records 238*a*–238*c* to consolidate the tokens 248 in records 238. For example, record 238*b* contains four instances of the "A" token 248 and three instances of the "AA" token 248. Indexing engine 126 may consolidate the tokens 248 in records 238*a*–238*c* by ensuring that a token 248 is listed only once in a record 238. Indexing engine 126 may also include a count value 270 for each token 248 identifying the number of times that the associated token 248 appears in a record 238. While indexing engine 126 may consolidate records 238 as shown in FIG. 2C, system 100 need not consolidate records 238.

In one embodiment, indexing engine 126 may sort the tokens 248 contained in records 238 after generating the multiple-word tokens 248*b* as shown in FIG. 2B, when consolidating the entries in records 238 as shown in FIG. 2C, or at any other suitable time. For example, in one embodiment, indexing engine 126 may sort the tokens 248 in each record 238 in alphabetical order, although any other suitable ordering may be used without departing from the scope of the present invention.

As illustrated in FIG. 2D, indexing engine 126 may further process records 238*a*–238*c* from FIG. 2C and replace the tokens 248 in records 238 with token representations 250. In the illustrated embodiment, token representations 250 include integers, although any other suitable identifiers may be used to identify tokens 248. In one embodiment, indexing engine 126 uses a mapping between tokens 248 and token representations 250 from a token table, such as token table 140 of system 100. By replacing tokens 248, which may represent large text strings, with token representations 250, system 100 may be able to perform operations more quickly. In another embodiment, system 100 need not replace tokens 248 in records 238 with token representations 250.

Although FIGS. 2A through 2D illustrate example records 238*a*–238*c*, various changes may be made to FIGS. 2A through 2D without departing from the scope of the present invention. For example, any suitable number of records 238 may be used in system 100, and each record 238 may contain any suitable number of tokens 248. Also, while FIG. 2B illustrates one example of how to generate multiple-word tokens 248*b* using one-word tokens 248*a*, any other suitable method may be used to identify tokens 248 in system 100. In addition, indexing engine 126 need not consolidate records 238 as illustrated in FIG. 2C and/or replace tokens 248 with token representations 250 as illustrated in FIG. 2D.

FIG. 3 is a block diagram illustrating an example token table 340. Token table 340 may, for example, be useful as token table 140 in system 100 of FIG. 1. In the illustrated embodiment, token table 340 includes one or more entries 372. Each entry 372 includes a token index 250, a token 248, a count value 374, and a weight 376. Other embodiments of token table 340 may be used without departing from the scope of the present invention. Also, the information contained in token table 340 is for illustration only. In the illustrated example, token table 340 contains information associated with records 238*a*–238*c* of FIGS. 2A through 2D. Any other suitable information may be stored in token table 340 without departing from the scope of the present invention.

Token index 250 identifies entries 372 in token table 340. In one embodiment, token table 340 includes one entry 372 for each unique token 248 that appears in a set of records 238. In this embodiment, token index 250 may uniquely identify each entry 372 in token table 340. As a result, token index 250 may also uniquely identify each token 248 in a set of records 238, which allows token index 250 to act as token representations 150 in system 100 of FIG. 1 and/or in any other suitable system. In the illustrated embodiment, token index 250 includes integer values, although any other suitable values may be used to identify entries 372.

Tokens 248 represent tokens extracted from documents, such as documents 134 of system 100. As shown in FIG. 3, indexing engine 126 may alphabetize the tokens 248 in token table 340. This may allow, for example, indexing engine 126 to perform a binary search on token table 340 and identify the token index 250 associated with a known token 248.

Count value 374 represents the total number of times that a token 248 appears in a set of records 238. Weights 376 identify the relative importance of each token 248 in determining relationships between records 238. In one embodiment, the weight 376 of a token 248 is inversely proportional to the count value 374 of token 248. As shown in FIG. 3, tokens 248 with larger count values 374 have lower weights 376, while tokens 248 with smaller count values 374 have larger weights 376. System 100 may use any suitable method to determine weights 376. In a particular embodiment, indexing engine 126 determines the weight of each token 248 using the formula:

$$\text{Weight}_{Token} = -\log_2\left(\frac{\text{Count}_{Token}}{\text{Total}_{Tokens}}\right)$$

where $\text{Weight}_{Token}$ represents the weight of a token 248, $\text{Count}_{Token}$ represents the count value 374 associated with the token 248, and Total$_{Tokens}$ represents the total or sum of all count values 374 in token table 340. Other weights may be used in system 100 without departing from the scope of the present invention. For example, although the above formula illustrates taking the negative log in base two, other bases such as base ten could be used.

In one embodiment, system 100 may treat tokens 248 having smaller weights 376 as being of lesser importance in determining relationships between records 238. For example, as shown in FIG. 2B, if two records 238 contain the token "A," this means very little in determining any possible relationship between those two records 238. This is because token "A" is the most common token 248 in records 238. Because many records 238 may contain the token "A," the presence of token "A" in both records 238 provides little information in determining whether a relationship exists between those two records 238. Along similar lines, the token "BC" appears only twice in records 238a–238c. As a result, the appearance of token "BC" in two records 238 would tend to indicate that those two records 238 are related because both records 238 contain a relatively rare token 248.

Although FIG. 3 illustrates one example of token table 340, various changes may be made to token table 340 without departing from the scope of the present invention. For example, any suitable identifiers may be used as token index 250. Also, tokens 248 may or may not be sorted in token table 340. In addition, while FIG. 3 illustrates the use of a table 340 to store information, any other suitable data structure, compilation and/or arrangement may be used to store the information in table 340.

FIG. 4 is a block diagram illustrating an example records table 442. Records table 442 may be useful, for example, as records table 142 of FIG. 1. In the illustrated embodiment, records table 442 includes one or more entries 480. Each entry 480 includes an entry index 482, a token index 250, and a count value 270. Other embodiments of records table 442 may be used without departing from the scope of the present invention. Also, the information contained in records table 442 in the illustrated embodiment is for illustration only. In the illustrated embodiment, records table 442 contains information about records 238a–238c of FIGS. 2A through 2D. Records table 442 may store any other suitable information about any other suitable records without departing from the scope of the present invention.

In one embodiment, records table 442 includes at least one entry 480 for each record 238. In a particular embodiment, records table 442 includes at least one entry 480 for each unique token 248 contained in a record 238. For example, in the illustrated embodiment, the first six entries 480 are associated with the six tokens 248 contained in record 238a, the next two entries 480 are associated with the two tokens 248 contained in record 238b, and the last six entries 240 are associated with the six tokens 248 contained in record 238c.

Entry index 482 identifies each entry 480 in records table 442. In the illustrated embodiment, entry index 482 includes integer values, although any other suitable identifier may be used to identify entries 480. Token index 250 identifies a token 248 contained in a record 238. Count value 270 represents the number of times that the token 248 identified by token index 250 appears in the record 238.

Although FIG. 4 illustrates one example of records table 442, various changes may be made to table 442 without departing from the scope of the present invention. For example, entry index 482 may include any suitable identifier and is not limited to the use of integer values. Also, token index 250 could be replaced by the actual tokens 248. In addition, while FIG. 4 illustrates the use of a table 442 to store information, any other suitable data structure, compilation and/or arrangement may be used to store the information in table 442.

FIG. 5 is a block diagram illustrating an example records table index 544. Records table index 544 may be useful, for example, as records table index 144 in system 100 of FIG. 1. In the illustrated embodiment, records table index 544 includes one or more entries 590. Each entry 590 includes a record index 592, a record table entry 482, and a record score 594. Other embodiments of records index table 544 may be used without departing from the scope of the present invention. Also, the information contained in the illustrated embodiment of records table index 544 is for illustration only. In the illustrated example, records table index 544 is associated with records 238a–238c of FIGS. 2A through 2D. Any other suitable information may be used in records table index 544 without departing from the scope of the present invention.

In one embodiment, records table index 544 may include an entry 590 for each record 238 in system 100. In a particular embodiment, each entry 590 in records table index 544 may identify where information for a record 238 is stored in records table 442.

Record index 592 identifies the various records 238 in system 100. In the illustrated embodiment, record index 592 uses integer values to identify records 238, although any other suitable identifier may be used to identify records 238. Records table entry 482 identifies the first entry 480 in records table 442 associated with the record 238 identified by record index 592. For example, information about the first record 238 in records table 442 begins at the first entry 480 in table 442. The first entry 480 in table 442 has an entry index 482 of "1," so the entry 590 in table 544 also has a records table entry 482 of "1." Similarly, information about the second and third records 238 begins at the seventh and ninth entries 480, respectively, of records table 442. As a result, the second and third entries 590 include records table entries 482 of "7" and "9," respectively. This allows various components in system 100, such as relationship engine 128, to identify where information about a particular record 238 is stored in records table 442.

Record score 594 identifies a score associated with each record 238. In one embodiment, the record score 594 of a record 238 is based, at least partially, on the counts 270 associated with the tokens 248 contained in the record 238 and the weights 376 associated with those tokens 248. In a particular embodiment, indexing engine 126 may generate a score 594 using the formula:

$$\text{Score}_{Record} = \sum_{i=1}^{j} (\text{Weight}_{Token\ i} * \text{Count}_{Token\ i})$$

where Score$_{Record}$ represents the record score 594 of a record 238, j represents the number of different or unique token indexes 250 associated with the record 238, Weight$_{Token\ i}$ represents the weight 376 associated with the ith unique token index 250, and Count$_{Token\ i}$ represents the count value 270 associated with the ith unique token index 250. Other scores may be used in system 100 without departing from the scope of the present invention.

In one embodiment, relationship engine 128 may use records table 442 and records table index 544 to generate relationship indicators for records 238. For example, to generate a relationship indicator, relationship engine 128 may use table 442 to compare the token indexes 250 associated with a target record 238 to the token indexes 250 associated with a selected record 238. Relationship engine 128 may then identify any token indexes 250 that are common to both records 238. In this way, relationship engine 128 may determine whether both records 238 contain the same tokens 248.

Relationship engine 128 may also use count values 270 to determine how many times a common token 248 appears in both records 238. The minimum number of times that a token 248 appears in two records 238 may be referred to as a "shared" or "common" count value. In one embodiment, if two records 238 include the same token 248, records table 442 would include two entries 480 (one for each record 238) containing the token index 250 associated with that token 248. Each entry 480 may also contain a count value 270. In this embodiment, relationship engine 128 may determine the shared count value associated with that token 248 by selecting the smaller of the two count values 270. As an example, relationship engine 128 could determine that both record 238a and record 238b contain a token index 250 of "1" (represented by the first and seventh entries 480 in table 442). Relationship engine 128 may also determine that the first entry 480 has a count value 270 of "2" and the seventh entry 480 has a count value 270 of "4." Relationship engine 128 may then determine that the smaller count value 270 equals two, so the shared count value associated with the token index "1" would also equal two. This means that both record 238a and record 238b include at least two instances of the token 248 represented by the token index "1."

Relationship engine 128 may then use the shared count values and the weights 376 associated with the common token indexes 250 to determine the relationship indicator using the formula:

$$RI_{Selected\ Record} = \frac{\sum_{i=1}^{j} (Weight_{Token\ i} * Shared\ Count_{Token\ i})}{Score_{Target\ Record}}$$

where $RI_{Selected\ Record}$ represents the relationship indicator associated with the selected record 238, j represents the number of unique token indexes 250 that are common to both the selected record 238 and the target record 238, $Weight_{Token\ i}$ represents the weight 376 associated with the ith common token index 250, Shared $Count_{Token\ i}$ represents the shared count value associated with the ith common token index 250, and $Score_{Target\ Record}$ represents the score of the target record 238 from records table index 544. Other relationship indicators may be used without departing from the scope of the present invention.

As a particular example, relationship engine 128 may compare target record 238a and selected record 238b. Relationship engine 128 may access records index table 544 and identify the starting entries 480 in records table 442 for records 238a and 238b. Relationship engine 128 may also access records table 442 and determine that the only token index 250 common to both record 238a and record 238b is a token index 250 of "1." This is illustrated in FIG. 4, where the first entry 480 in table 442 (record 238a) and the seventh entry 480 (record 238b) are associated with a token index 250 of "1." Relationship engine 128 may further determine that the shared count value associated with the token index 250 of "1" equals two, the smaller of the count values 270 in the two entries 480 in records table 442. This is confirmed in FIG. 2B, where the token 248 of "A," which corresponds to the token index 250 of "1," appears twice in record 238a and four times in record 238b. Relationship engine 128 may identify the record score 594 associated with the target record 238a using table 544. Using the formula shown above, the relationship indicator for the selected record 238b would equal the shared count value of the token index 250 multiplied by the weight 376 associated with the token index 250, divided by the record score 594 of target record 238a. This produces a relationship indicator for record 238b of (2*1.58/20.95), or 0.15, when record 238b is compared to target record 238a.

To compare selected record 238c to the target record 238a, relationship engine 128 may use records table 442 and determine that records 238a and 238c each includes five common token indexes 250, which are "1," "4," "6," "7," and "8." Relationship engine 128 may also determine that the shared count value associated with each of these common token indexes 250 equals one. In other words, each token 248 associated with a common token index 250 appears only once in each of records 238a and 238c. Using this information, relationship engine 128 may determine that the relationship indicator for record 238c equals [(1*1.58+ 1*2.81+1*3.39+1*3.39+1*3.39)/20.95], or 0.69, when record 238c is compared to target record 238a.

These relationship values indicate that record 238c is more related to record 238a than is record 238b. This can be confirmed by examining the tokens 248 contained in records 238 shown in FIG. 2B. Records 238a and 238b share one common token 248, the token "A." However, as shown in FIG. 3, the token "A" is the most common token in records 238. As a result, the presence of token "A" in both records 238a and 238b provides little information in determining whether a relationship exists between records 238a and 238b. In other words, records 238a and 238b may not be very related because both records 238 share only the most common token 248. On the other hand, records 238a and 238c share a larger number of tokens 248, including the tokens "A," "B." "C," "BC," and "CA." Also, the tokens 248 that are common between records 238a and 238c appear less often in records 238, meaning that these tokens 248 are relatively more rare than the token "A." As a result, the presence of a larger number of rarer tokens 248 in both records 238a and 238c would indicate a higher degree of relationship between those records 238. This explains why the relationship indicator associated with record 238b is lower than the relationship indicator associated with record 238c, when records 238b and 238c are compared to target record 238a.

Although FIG. 5 illustrates one example of records table index 544, various changes may be made to records table index 544 without departing from the scope of the present invention. For example, record index 592 could include any suitable identifier and is not limited to the use of integer values. Also, records table index 544 could include additional information, such as the number of entries 480 in records table 442 associated with each record 238. In addition, records table index 544 could omit information, such as record score 594. In one embodiment, record scores 594 may be pre-computed by indexing engine 126, and relationship engine 128 may use the pre-computed record scores 594 to generate relationship indicators. Pre-computing record scores 594 may help to increase the speed at which the relationship engine 128 generates the relationship indicators. In another embodiment, relationship engine 128 could compute record scores 594 after a user has requested that relationship engine 128 generate the relationship indicators.

FIG. 6 is a flow diagram illustrating an example method 600 for identifying relationships between records. Method 600 may, for example, be used by system 100 of FIG. 1 to identify relationships between records 138. Other systems may use other methods to identify relationships between records without departing from the scope of the present invention.

System 100 receives at least a portion of the contents of one or more documents 134 at step 602. This may include, for example, host 102 receiving documents 134 from one or more clients 104 over network 106, from a compact disc or other computer readable medium through drive 116 or other suitable interface, by scanning physical pages of text using scanner 156, or in any other suitable manner. System 100 identifies tokens 148 in the contents of documents 134 at step 604. This may include, for example, optical character recognition engine 122 and/or one or more file converters 124 generating text files 136 containing at least a portion of the contents of documents 134. This may also include indexing engine 126 identifying one or more tokens 148 in each of the text files 136. This may further include indexing engine 126 generating one or more records 138 containing the identified tokens 148.

System 100 determines a weight for each of the tokens 148 at step 606. This may include, for example, indexing engine 126 identifying the number of times that each token 148 appears in records 138. This may also include indexing engine 126 identifying the total number of instances of all tokens 148 in records 138. This may further include indexing engine 126 using these values to generate the weights associated with tokens 148. In a particular embodiment, the weight of each token 148 may be determined using the formula described above with respect to FIG. 3, although any other suitable weights may be used without departing from the scope of the present invention.

System 100 determines one or more relationship indicators using the token weights at step 608. In a particular embodiment, the relationship indicator represents the level or degree to which two documents 134, text files 136, and/or records 138 are related. This may include, for example, relationship engine 128 identifying a target record 138 to which one or more other records 138 will be compared. This may also include relationship engine 128 accessing records table 142 and identifying one or more token representations 150 that are contained in both records 138. This may further include relationship engine 128 using the token weights associated with the common token representations 150, the record score associated with the target record 138, and/or any other suitable information to generate a relationship indicator. In a particular embodiment, relationship engine 128 uses the formula discussed above with respect to FIG. 5 in determining the relationship indicator, although any other suitable relationship indicators may be used without departing from the scope of the present invention.

System 100 may then take any suitable action after determining the relationship indicators. This may include, for example, system 100 displaying a link to a document 134 associated with a record 138 that has a relationship indicator exceeding a specified value.

Although FIG. 6 illustrates one example of a method 600 for identifying relationships between records, various changes may be made to method 600 without departing from the scope of the present invention. For example, FIG. 6 illustrates system 100 determining a weight for each token 148 at step 606 before determining relationship indicators at step 608. In another embodiment, system 100 may determine the weights of tokens 148 while system 100 is determining the relationship indicators. In addition, system 100 has been described as identifying tokens 148 by generating text files 136. System 100 could identify tokens 148 in any other suitable manner, with or without the use of text files 136 or other files to store the contents of documents 134.

FIG. 7 is a flow diagram illustrating an example method 700 for generating text files. Method 700 may, for example, be useful in system 100 of FIG. 1 for generating text files 136 containing at least a portion of the contents of documents 134. Other systems may use other methods to generate text files and/or other types of files without departing from the scope of the present invention.

System 100 receives documents 134 at step 702. This may include, for example, host 102 receiving documents 134 from client 104 over network 106, through drive 116, using scanner 156, or in any other suitable manner. System 100 selects a first document 134 at step 704.

System 100 determines whether the selected document 134 represents an image of a physical page of text at step 706. This may include, for example, host 102 examining the file extension associated with the selected document 134 and determining whether the file extension is associated with an image file. As a particular example, host 102 may treat documents 134 having a file extension of ".tif" as an image document 134, while documents 134 having file extensions of ".doc," ".wpd," and ".xls" are treated as non-image documents 134.

If the selected document 134 represents an image document, system 100 performs optical character recognition on the document 134 at step 708. This may include, for example, optical character recognition engine 122 processing the selected document 134 and generating a text file 136 containing at least a portion of the text contained in the image document 134. If the selected document 134 is not an image document, system 100 performs a file conversion at step 710. This may include, for example, one or more file converters 124 extracting at least a portion of the text contained in the selected document 134 and storing the extracted text in a text file 136.

System 100 determines whether additional documents 134 remain to be processed at step 712. This may include, for example, host 102 determining whether a text file 136 has been produced for each document 134. If additional documents 134 remain, system 100 selects the next document 134 at step 714. System 100 then returns to step 706 to process the next selected document 134. Otherwise, method 700 ends. System 100 has processed each of the documents 134 received at step 702.

Although FIG. 7 illustrates one example of a method 700 for generating text files 136, various changes may be made to method 700 without departing from the scope of the present invention. For example, depending on the environment, system 100 may be used to process only image documents 134, so steps 706 and 710 may be omitted from method 700. Similarly, in another environment, system 100 may be used to process only non-image documents 134, and step 706 and 708 may be omitted from method 700. Also, while FIG. 7 illustrates the conversion of documents 134 to text files 136 using either optical character recognition or file conversion, any other and/or additional technique may be used to extract at least a portion of the contents of documents 134. In addition, while FIG. 7 illustrates system 100 converting documents 134 into text files 136, system 100 could convert documents 134 into any other suitable type of information without departing from the scope of the present invention.

FIG. 8 is a flow diagram illustrating an example method 800 for generating records. Method 800 may, for example, be useful in system 100 of FIG. 1 for generating records 238a–238c shown in FIGS. 2A through 2D. Other systems may use other methods to generate database records without departing from the scope of the present invention.

System 100 selects a first text file 136 at step 802. This may include, for example, indexing engine 126 selecting one of the text files 136 generated using method 700 of FIG. 7. System 100 creates a new record for the selected text file 136 at step 804. This may include, for example, indexing engine 126 generating a new record 238 associated with the selected text file 136. The record 238 may represent any suitable data structure, compilation and/or arrangement of information.

System 100 identifies one-word tokens 248a in text file 136 at step 806. This may include, for example, indexing engine 126 searching text file 136 and locating any predefined tokens 248a. This may also include indexing engine 126 processing each word in text file 136 as a one-word token 248a. This may further include indexing engine 126 ignoring any stop words and/or symbols in text file 136, such as common words and punctuation marks. System 100 inserts the one-word tokens 248a into the record 238 at step 808. This may include, for example, indexing engine 126 storing the list of one-word tokens 248a in record 238.

System 100 selects the first pair of one-word tokens 248a at step 810. This may include, for example, indexing engine 126 selecting the first two one-word tokens 248a in the record 238. System 100 generates a two-word token 248b at step 812. This may include, for example, indexing engine 126 combining the selected one-word tokens 248a. System 100 inserts the two-word token 248b in record 238 at step 814. System 100 determines whether additional one-word tokens 248a remain to be processed in record 238 at step 816. This may include, for example, indexing engine 126 determining whether the last one-word token 248a in record 238 has been included in a two-word token 248b. If additional one-word tokens 248a remain, system 100 selects the next pair of one-word tokens 248a at step 818. In one embodiment, the next pair of one-word tokens 248a may include the second one-word token 248a from the previous pair and a new one-word token 248a from record 238 that has not been processed. In another embodiment, the next pair of one-word tokens 248a may include two new one-word tokens 248a from record 238 that have not been processed.

If system 100 has processed all of the one-word tokens 248a in record 238, system 100 determines whether additional text files 136 remain to be processed at step 820. This may include, for example, indexing engine 126 determining whether a record 238 has been generated for each text file 136. If additional text files 136 remain, system 100 selects the next text file 136 at step 822. System 100 then returns to step 804 to create a new record 238 for the next selected text file 136.

Otherwise, system 100 consolidates the tokens 248 in records 238 at step 824. This may include, for example, indexing engine 126 consolidating multiple instances of a token 248 in a record 238 into a single instance of the token 248. This may also include indexing engine 126 storing a count value 270 for each token 248 contained in a record 238. This may allow system 100 to reduce the size of one or more records 238, while maintaining information identifying the number of times that each token 248 appears in a record 238.

System 100 replaces tokens 248 in records 238 with token representations or indexes 250 at step 826. This may include, for example, indexing engine 126 generating a token table, such as token table 340 illustrated in FIG. 3, which contains tokens 248 and token indexes 250. This may also include indexing engine 126 using token table 340 to replace tokens 248 in records 238 with the token indexes 250 associated with the tokens 248.

Although FIG. 8 illustrates one example of a method 800 for generating records 238, various changes may be made to method 800 without departing from the scope of the present invention. For example, FIG. 8 illustrates system 100 identifying one-word tokens 248a and then generating two-word tokens 248b using combinations of one-word tokens 248a. System 100 could also generate only one-word tokens 248a, only two-word tokens 248b, tokens 248 containing more than two words, and/or any other suitable tokens 248. Also, system 100 could identify two-word tokens 248b by scanning text files 136 or by any other suitable manner, rather than combining one-word tokens 248a extracted from text file 136. Further, FIG. 8 illustrates system 100 as processing text files 136 in a serial fashion, although system 100 could process text files 136 or other files in a parallel fashion or in any other suitable manner. In addition, system 100 may, but need not, consolidate tokens 248 at step 824 and/or replace tokens 248 with token indexes 250 at step 826.

FIG. 9 is a flow diagram illustrating an example method 900 for generating a token table. Method 900 may, for example, be useful in system 100 of FIG. 1 for generating token table 340 shown in FIG. 3 using records 238 shown in FIGS. 2A through 2D. Other systems may use other methods to generate a token table without departing from the scope of the present invention. Also, method 900 may be described as processing records 238 containing tokens 248, such as records 238 shown in FIG. 2B. Method 900 could also be used to process records 238 that contain token indexes 250, such as records 238 shown in FIG. 2D.

System 100 determines the number of different tokens 248 contained in a set of records 238 at step 902. This may include, for example, indexing engine 126 examining records 238 and identifying the number of unique tokens 248 contained in records 238. System 100 generates an entry 372 in token table 340 for each unique token 248 at step 904. System 100 inserts tokens 248 into entries 372 in token table 340 at step 906. This may include, for example, indexing engine 126 inserting one token 248 into each entry 372 in token table 340.

System 100 generates a token index 250 for each token 248 at step 908. This may include, for example, indexing engine 126 generating a series of integer values, one value for each entry 372 in token table 340. System 100 inserts token index 250 into entries 372 of token table 340 at step 910.

System 100 determines the total count 374 of each token 248 in the set of records 238 at step 912. This may include, for example, indexing engine 126 identifying the total number of times that a token 248 appears in a set of records 238. System 100 inserts counts 374 into entries 372 of token table 340 at step 914.

System 100 determines the total count of all tokens 248 in the set of records 238 at step 916. This may include, for example, indexing engine 126 summing the counts 374 in entries 372. System 100 determines a token probability for each token 248 at step 918. In one embodiment, the token probability for a token 248 is determined using the formula:

$$Prob_{Token} = \frac{Count_{Token}}{Total_{Tokens}}$$

where $Prob_{Token}$ represents the probability of a token 248, $Count_{Token}$ represents the count 374 of token 248, and $Total_{Tokens}$ represents the total number of instances of all tokens 248 in records 238. Other probabilities may be used without departing from the scope of the present invention.

System 100 determines a weight 376 for each token 248 at step 920. This may include, for example, indexing engine 126 using the token probabilities computed during step 918. As a particular example, indexing engine 126 may generate weights 376 by calculating the negative log of the token probabilities computed during step 918. System 100 inserts weights 376 into entries 372 in token table 340 at step 922, and method 900 ends.

Although FIG. 9 illustrates one example of a method 900 for generating a token table 340, various changes may be made to method 900 without departing from the scope of the present invention. For example, system 100 could insert token indexes 250 into token table 340 before inserting tokens 248 into token table 340. Also, the information described as being stored in table 340 could also be stored in any other data structure, compilation, and/or arrangement of information. Further, system 100 could generate and/or update entries 372 by processing records 238 one token 248 at a time. As a particular example, indexing engine 126 could select a token 248 in a record 238 and determine if an entry 372 associated with that token 248 already exists in token table 340. If an entry 372 does not exist, indexing engine 126 could create an entry 372 and initialize the count value 374 to one. If an entry 372 already exists, indexing engine 126 could increment the count value 374 by one.

In addition, method 900 could be modified to allow information about new records 238 to be inserted into a pre-existing token table 340. For example, if a new record 238*d* is added to the set of records 238, indexing engine 126 could identify a unique token 248 contained in record 238*d* that is not contained in the other records 238*a*–238*c*, and indexing engine 126 could generate a new entry 372 for the new unique token 248. Indexing engine 126 could then follow steps 906–922 to complete the new entry 372 associated with the new token 248. In addition, the presence of a new record 238*d* in the set of records 238 may change the counts 374 and the weights 376 of one or more entries 372. As a result, indexing engine 126 may recompute the count 374 and/or weight 376 of one or more entries 372 when a new record 238*d* is added.

FIG. 10 is a flow diagram illustrating an example method 1000 for generating a records table and a records table index. Method 1000 may, for example, be useful in system 100 of FIG. 1 for generating records table 442 and records table index 544 using records 238 shown in FIGS. 2A through 2D. Other systems may use other methods to generate a records table and/or a records table index. Also, method 1000 may be described as processing records 238 containing tokens 248, such as records 238 shown in FIG. 2B. Method 1000 could also be used to process records 238 that contain token indexes 250, such as records 238 shown in FIG. 2D.

System 100 selects a first record 238 at step 1002. This may include, for example, indexing engine 126 selecting a record 238 from a set of records 238. System 100 determines the number of different or unique tokens 248 contained in the selected record 238 at step 1004. System 100 generates a new entry 480 in records table 442 for each unique token 248 in the selected record 238 at step 1006. This may include, for example, indexing engine 126 generating one or more new entries 480 and inserting an entry index 482 into each new entry 480. System 100 inserts a token index 250 into each new entry 480 at step 1008. This may include, for example, indexing engine 126 using the identity of a token 248 to access token table 340, identify the token index 250 associated with that token 248, and insert the retrieved token index 250 into an entry 480 in records table 442.

System 100 inserts a count value 270 into each new entry 480 in records table 442 at step 1010. This may include, for example, indexing engine 126 identifying the number of times that a token 248 appears in the selected record 238. At this point, system 100 has completed each entry 480 associated with the selected record 238 in records table 442.

System 100 generates a new entry 590 in records table index 544 at step 1012. This may include, for example, indexing engine 126 generating a new entry 590 and inserting a record index 592 into the new entry 590. System 100 stores the location of the first entry 480 associated with the selected record 238 at step 1014. This may include, for example, indexing engine 126 identifying the first entry 480 associated with the selected record 238, identifying the entry index 482 of that entry 480, and inserting the records table index 482 into the new entry 590 in records table index 544.

System 100 computes the record score 594 of the selected record 238 at step 1016. This may include, for example, indexing engine using the token indexes 250 and count values 270 associated with the selected record 238 and the token weights 376 associated with the token indexes 250 to compute the record score 594. In a particular embodiment, the record score 594 may be determined using the formula described above with respect to FIG. 5, although any other suitable record scores may be used without departing from the scope of the present invention. System 100 inserts the record score 594 of the selected record 238 into the new entry 590 of records table index 544 at step 1018. At this point, system 100 has completed the new entry 590 in records table index 544.

System 100 determines whether more records 238 remain to be processed at step 1020. This may include, for example, system 100 determining whether information about each record 238 has been stored in records table 442 and/or records table index 544. If additional records 238 remain, system 100 selects the next record 238 at step 1022. System 100 then returns to step 1004 to process the next selected record 238. Otherwise, method 1000 ends.

Although FIG. 10 illustrates one example of a method for generating records table 442 and records table index 544, various changes may be made to method 1000 without departing from the scope of the present invention. For example, FIG. 10 illustrates system 100 as generating and filling entries 480 in records table 442 before generating and filling an entry 590 in records index table 544. System 100 could also generate and fill entries 480 and 590 in a different order or at the same time.

FIG. 11 is a flow diagram illustrating an example method 1100 for determining relationship indicators between a target record and records in a record set. Method 1100 may, for example, be useful in system 100 of FIG. 1 for processing records 238 shown in FIGS. 2A through 2D. Other systems may process any other suitable records without departing from the scope of the present invention.

System 100 selects the first record 238 in the set of records 238 at step 1102. This may include, for example, a user instructing relationship engine 128 to process all or a subset of the documents 134 in system 100. This may also include relationship engine 128 identifying the records 238 associated with the identified documents 134 and selecting one of the records 238 in the set.

System 100 compares a target record 238 to the selected record 238 at step 1104. This may include, for example, the user identifying the document 134 that other documents 134 are to be compared with, and relationship engine 128 identifying the target record 138 associated with the identified document 134. This may also include relationship engine 128 accessing records table index 544, identifying the entries 480 associated with the target record 238 and the selected record 238, and accessing records table 442. System 100 identifies the tokens 248 that are common to both the target record 238 and the selected record 238 at step 1106. This may include, for example, relationship engine 128 identifying the token indexes 250 associated with the target record 238, identifying the token indexes 250 associated with the selected record 238, and determining whether any of the identified token indexes 250 are contained in both records 238. The token indexes 250 contained in both records 238 represent common tokens 248.

System 100 identifies the common or shared count associated with each of the common tokens 248 at step 1108. This may include, for example, relationship engine 128 identifying the smaller count value 270 contained in two entries 480 associated with a common token 248. System 100 determines an overlap value associated with the selected record 238 at step 1110. This may include, for example, relationship engine 128 determining the overlap value using the token weights 376 associated with the common tokens 248 and the common count values associated with the common tokens 248. In a particular embodiment, the overlap value may be determined using the formula:

$$OV_{Selected\ Record} = \sum_{i=1}^{j} (Weight_{Token\ i} * Common\ Count_{Token\ i})$$

where $OV_{Selected\ Record}$ represents the overlap value associated with the selected record 238, j represents the number of unique token indexes 250 that are common between the selected record 238 and the target record 238, $Weight_{Token\ i}$ represents the weight 376 associated with the ith common token index 250, and $Common\ Count_{Token\ i}$ represents the common count value associated with the ith common token index 250.

System 100 divides the overlap value produced at step 1110 by the record score 594 of the target record 238 at step 1112. This may include, for example, relationship engine 128 accessing the records table index 544, locating the entry 590 associated with the target record 238, and retrieving the record score 594 from the records table index 544. This produces a relationship value or a relationship indicator associated with the selected record 238 as compared to the target record 238.

System 100 determines whether more records 238 remain to be processed in the set of records 238 at step 1114. This may include, for example, relationship engine 128 determining whether a relationship value has been generated for each record 238 in the set. If additional records 238 remain, system 100 selects the next record 238 at step 1116. System 100 then returns to step 1104 to generate a relationship value for the next selected record 238.

If no more records 238 remain to be processed, system 100 may take any other suitable action. For example, system 100 may select one or more records 238 from the set of records 238 to be displayed to the user at step 1118. This may include, for example, relationship engine 128 selecting the records 238 having a relationship value that exceeds a specified value, such as a value specified by the user. This may also include relationship engine 128 making a list of documents 134 associated with those records 238 available to the user. This may further include relationship engine 128 making links to those documents 134 available to the user. System 100 may display or otherwise make available this and/or any other suitable information to a user.

Although FIG. 11 illustrates one example of a method 1100 for identifying relationships between records 238, various changes may be made to method 1100 without departing from the scope of the present invention. For example, the target record 238 used by system 100 could represent one of the records 238 contained in the set of records 238, a record 238 generated using a synthetic document 134 provided by the user, or any other suitable record. Also, although FIG. 11 illustrates system 100 as processing each record 238 in the set of records 238 in a serial manner, system 100 could process records 238 in parallel or in any other suitable manner.

FIG. 12 is a block diagram illustrating an example token table 1240 using correlithm objects 1202 to represent tokens 1248. Token table 1240 may, for example, be useful as token table 140 in system 100 of FIG. 1. In the illustrated embodiment, token table 1240 includes one or more entries 1272. Each entry 1272 includes a token 1248, a token representation 1250, and a count value 1274. Each token representation 1250 includes a corob 1202 and a significance vector 1206. Other embodiments of token table 1240 may be used without departing from the scope of the present invention. Also, the information contained in token table 1240 is for illustration only. Any other suitable information may be stored in token table 1240 without departing from the scope of the present invention.

In one embodiment, a corob 1202 represents a point in space. In this specification, the term "space" may refer to a geometrical area having zero or more dimensions defined by a set of coordinate axes. If N different dimensions exist in the space, the space may be referred to as "N-space." In a particular embodiment, a corob 1202 may include an array or other data structure having an entry 1204 for each dimension in the space. If N different dimensions exist in the space, the corob 1202 may include N entries 1204, each entry 1204 associated with one of the dimensions. The value of a particular entry 1204 represents the position or location of the point along the dimension associated with that entry 1204. When taken together, the entries 1204 define a particular point in the N-space. The entries 1204 in a corob 1202 may include real numbers, imaginary numbers, complex numbers, binary numbers, or any other suitable values. Also, in one embodiment, the values of an entry 1204 in a corob 1202 may be restricted to a range of values, such as between 0.0 and 1.0 inclusive.

In a particular embodiment, a corob 1202 represents a point in a generalized sub-space of a particular N-space. The term "sub-space" may refer to any set of M dimensions of the N-space, where $0 \leq M \leq N$. A sub-space may include all, some, or none of the dimensions of the N-space. A "generalized sub-space" may refer to a sub-space in which the participation of each dimension from the N-space has been defined. The term "participation" may refer to the degree to which a dimension is contained within the sub-space. A dimension could be completely contained within a sub-space, fractionally contained within the sub-space, or completely outside the sub-space. A "significance value" represents the degree of participation of a dimension in a sub-space. For example, a dimension completely contained within a sub-space could have a significance value of 1.0, a dimension completely outside the sub-space could have a significance value of 0.0, and dimensions fractionally contained within the sub-space could have significance values between 0.0 and 1.0. A significance vector 1206 may be associated with a corob 1202 and contain a significance value 1208 for each dimension in the N-space. Because the significance vector 1206 identifies the participation of each dimension from the N-space in the sub-space, the significance vector 1206 may help to define a "generalized sub-space" of the N-space.

In general, corobs 1202 representing random points in space have an expected or "standard" distance from one another. In this specification, the term "random corob" may refer to a corob 1202 that represents a randomly selected point in space. Also, the term "distance" may refer to any consistent mechanism or mathematical basis for measuring distance between two corobs 1202. For example, the Cartesian distance from a first random corob 1202 to a second random corob 1202 may be determined using the formula:

$$\text{Distance} = \sqrt{\sum_{i=1}^{N} ((A_i - B_i)^2 * AS_i)}$$

where $A_i$ represents the ith entry 1204 of the first corob 1202, $B_i$ represents the ith entry 1204 of the second corob 1202, $AS_i$ represents the ith significance value 1208 in the significance vector 1206 associated with the first corob 1202, and N represents the number of dimensions of space. In another embodiment, system 100 may use the cross-correlation coefficient between two corobs 1202 or any other suitable method to measure distance between corobs 1202.

In one embodiment, the standard distance between random corobs 1202 increases monotonically as the number of dimensions increases, and the standard deviation of the distance is approximately constant. In a particular embodiment, the standard distance between random corobs 1202 may be approximately determined using the formula:

$$\text{Standard Distance} = \sqrt{\frac{N}{6}}$$

where N represents the number of dimensions in space. In this embodiment, the standard deviation is approximately:

$$\text{Standard Deviation} = \sqrt{\frac{7}{120}}$$

or 0.2415.

In one embodiment, system 100 may use corobs 1202 and/or significance vectors 1206 to represent tokens 1248. In a particular embodiment, corob engine 154 may generate corobs 1202 by randomly selecting points in space. In this embodiment, the corobs 1202 representing tokens 1248 are random corobs.

System 100 may also use corobs 1202 and/or significance vectors 1206 to represent the weights of tokens 1248. For example, in one embodiment, a corob 1202 represents a point in space, and the corob 1202 contains one entry 1204 for each dimension in that space. In this example, the weight of a token 1248 can be modeled linearly using the number of entries 1204 in the corob 1202. In a particular embodiment, the number of entries 1204 in a corob 1202 associated with token 1248 may be determined using the formula:

$$N_{Token} = \lceil \text{Weight}_{Token} * \text{Standard Deviation} \rceil$$

where $N_{Token}$ represents the number of entries 1204 in corob 1202, $\text{Weight}_{Token}$ represents the weight of token 1248, and Standard Deviation represents the standard deviation of the distance between random corobs 1202. As a particular example, if Standard Deviation is approximately 0.2415 and token 1248 has a weight of 414, the corob 1202 associated with token 1248 would have (414*0.2415), or 100, entries 1204. System 100 could then generate a corob 1202 having one hundred entries 1204 by randomly selecting a point in a 100-dimensional space. In this embodiment, a corob 1202 may have a different number of entries 1204 than other corobs 1202, depending on the weights of the corobs 1202.

In one embodiment, the value of $\text{Weight}_{Token}$ multiplied by Standard Deviation may not return an integer value, while system 100 may generate corobs 1202 having an integer number of entries 1204. For example, if a token 1248 has a weight of 63.1, ($\text{Weight}_{Token}$*Standard Deviation) would have a value of approximately 15.24, but system 100 may be able to produce a corob 1202 having fifteen or sixteen entries 1204. In one embodiment, after multiplying $\text{Weight}_{Token}$ and Standard Deviation, system 100 rounds the resulting value to the next highest integer value. System 100 uses this rounded value as $N_{Token}$ to generate a corob 1202, where the number of entries 1204 in corob 1202 equals the rounded value of $N_{Token}$. Continuing with the example, system 100 may round the value of 15.24 to the next highest integer value, 16. System 100 would produce a corob 1202 having $\lceil 15.24 \rceil$, or 16, entries 1204.

By rounding the value of $N_{Token}$ to the next highest integer value, the number of entries 1204 in corob 1202 may not exactly represent the weight of token 1248. To compensate for the inexact representation of the token weight, system 100 could scale the significance values 1208 in significance vectors 1206. In one embodiment, the significance values 1208 could ordinarily have a value between 0.0 and 1.0 inclusive. In a particular embodiment, system 100 may initially set each significance value 1208 in a significance vector 1206 to equal the same or approximately the same value, such as a value of one. System 100 could compensate for the inexact representation of the token weight by multiplying each significance value 1208 by V, which scales the significance values 1208 to lie between 0.0 and V inclusive when V<1.0. In one embodiment, V is determined using the formula:

$$V = \frac{\text{Weight}_{Token} * \text{Standard Deviation}}{N_{Token}}$$

where $\text{Weight}_{Token}$ represents the weight of token 1248, Standard Deviation represents the standard deviation of the distance between random corobs 1202, and $N_{Token}$ represents the number of entries 1204 in corob 1202. Continuing with the example above, if a token 1248 has a weight of 63.1, system 100 would produce a corob 1202 having ⌈15.24⌉, or 16, entries 1204. System 100 could also generate a significance vector 1206 having sixteen significance values 1208 and assign a value of one to each significance value 1208. System 100 could determine that V has a value of (63.1*0.02415)/16, or approximately 0.9524. System 100 may scale the significance values 1208 by multiplying the significance values 1208 by V, which would produce a significance vector 1206 having a value of 0.9524 in each entry 1208. In this manner, system 100 may accommodate the exact value of the weight of a token 1248, even though the number of entries 1204 in a corob 1202 may be unable to exactly represent the token weight. In another embodiment, system 100 could assign a value of one or other value to each significance value 1208 in significance vectors 1206, without scaling the significance values 1208.

In the illustrated embodiment, token table 1240 includes a count value 1274 for each token 1248. The count value 1274 of a token 1248 may identify the total number of times that the token 1248 appears in a set of records. In another embodiment, token table 1240 may not need to include a count value 1274 for each token 1248.

Although FIG. 12 illustrates one example of a token table 1240 that uses corobs 1202, various changes may be made to token table 1240 without departing from the scope of the present invention. For example, any suitable corobs 1202 and/or significance vectors 1206 having any number of entries may be used, and token table 1240 may include any suitable values for entries 1204 and/or significance values 1208. Also, while FIG. 12 illustrates token table 1240 as including one-word tokens 1248, token table 1240 could include tokens 1248 having any suitable length. Further, while FIG. 12 illustrates the use of a table 1240 to store information, any other suitable data structure, compilation and/or arrangement may be used to store the information in table 1240. In addition, FIG. 12 illustrates one example use of corobs in system 100. Corobs may also be used to implement other and/or additional features and functions in system 100.

Figure 13:
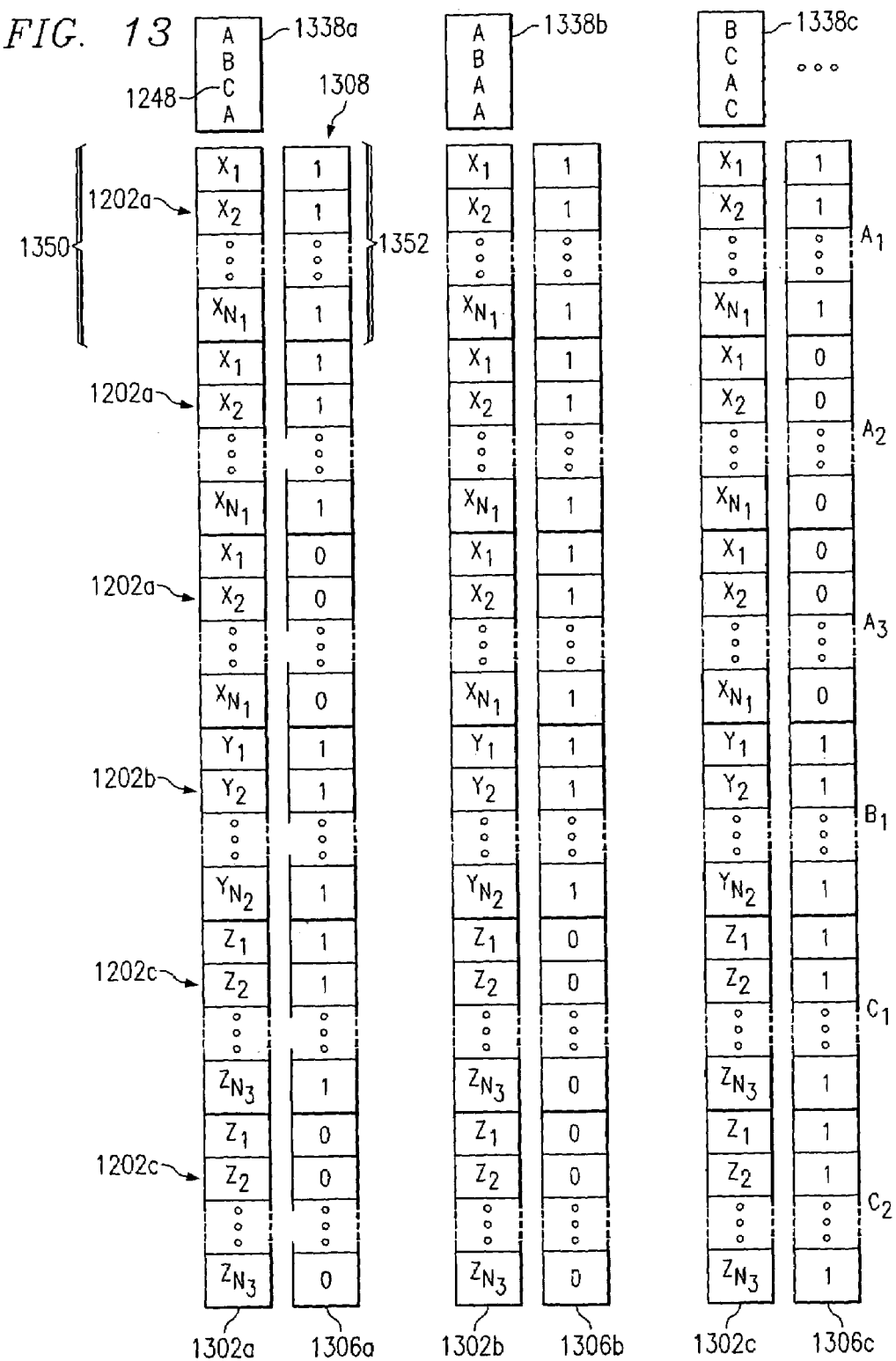
FIG. 13 is a block diagram illustrating an example of the correlithm objects used to represent records in a set of records.

FIG. 13 is a block diagram illustrating an example of the corobs 1302 used to represent records 1338 in a set of records 1338a–1338c. Corobs 1302 may, for example, be generated by corob engine 154 and used by relationship engine 128 to determine the relationship between records 1338. In the illustrated embodiment, each corob 1302 includes at least one entry 1350, and each entry 1350 represents a corob 1202 from token table 1240. Other embodiments of corob 1302 may be used without departing from the scope of the present invention.

In the illustrated embodiment, at least one entry 1350 corresponds to each token 1248 listed in token table 1240. In a particular embodiment, multiple entries 1350 in a corob 1302 may be associated with the same token 1248. For example, in the illustrated example, the first three entries 1350 in corobs 1302a–1302c are associated with the first token 1248. In this embodiment, the number of entries 1350 associated with a token 1248 equals the maximum number of times that the token 1248 appears in any one record 1338 in the record set. For example, the token "A" appears a maximum of three times in a single record 1338, in particular record 1338b. Similarly, the token "B" appears a maximum of one time in records 1338a–1338c, and the token "C" appears a maximum of two times in record 1338c. As a result, corob engine 154 may generate corobs 1302 having three entries 1350 associated with the token "A" (labeled $A_1$ through $A_3$), one entry 1350 associated with the token "B" (labeled $B_1$), and two entries 1350 associated with the token "C" (labeled $C_1$ and $C_2$). In other words, the number of entries 1350 in corobs 1302 may be determined using the formula:

$$\text{Number of Entries} = \sum_{i=1}^{j} (\text{Maximum Instances}_{Token_i})$$

where j represents the number of unique tokens 1248 in records 1338, and Maximum Instances$_{Token\ i}$ represents the maximum number of times that the ith unique token 1248 appears in a single record 1338. After determining a value for the number of entries 1350, corob engine 154 may generate one or more corobs 1302 having that number of entries 1350. Corob engine 154 may also insert the appropriate corob 1202 from token table 1240 in each entry 1350, thereby completing corobs 1302.

Each corob 1302 may also be associated with a significance vector 1306. In the illustrated embodiment, each significance vector 1306 includes at least one entry 1352 containing one or more significance values 1308. Each entry 1352 may be associated with the corob 1202 in the corresponding entry 1350 of corob 1302. In a particular embodiment, the values 1308 in an entry 1352 equal either zero or one, depending on whether an instance of a token 1248 associated with an entry 1350 is present in a record 1338. For example, in the illustrated embodiment, each corob 1302 includes three entries 1350 associated with the token "A" (labeled $A_1$ through $A_3$), and each significance vector 1306 includes three entries 1352 associated with the three entries 1350. If a record 1338 contains no instances of token "A," all three entries 1352 in the significance vector 1306 may contain values 1308 of zero. The zero values 1308 indicate that the record 1338 lacks any instance of the token "A." If a record 1338 contains one instance of token "A," one entry 1352 in the significance vector 1306 may contain values 1308 of one. The remaining two entries 1352 in the significance vector 1306 may contain values of zero. In this way, significance vectors 1306 may indicate the presence or absence of tokens 1248 in record 1338. The significance vectors 1306 may also identify the number of times that a token 1248 appears in a record 1338. In another particular embodiment, the values 1308 in an entry 1352 may equal either zero or the values 1208 in a significance vector 1206 from token table 1240. In this embodiment, values 1308 that equal values 1208 in a significance vector 1206 would indicate the presence of an instance of a token 1248 in a record 1338, and values 1308 of zero would indicate the absence of an instance of the token 1248 in the record 1338.

System 100 may use the corobs 1302 and significance vectors 1306 illustrated in FIG. 13 to determine the degree of relationship between two records 1338 each associated with a corob 1302 and a significance vector 1306. For example, relationship engine 128 and/or corob engine 154 could determine a relationship indicator involving a target record 1338a and a selected record 1338b using the formula:

$$RI_{Selected\ Record} = \frac{\sum_{i=1}^{N}\left[\left(Stnd.\ Dist._i^2 - \sum_{j=1}^{M}(A_j - B_j)^2\right)\frac{Overlap_{AS_i,BS_i}*}{}\right]}{\sum_{i=1}^{N}\left(Overlap_{AS_i,AS_i}*Stnd.\ Dist._i^2\right)}$$

where $RI_{Selected\ Record}$ represents the relationship indicator associated with the selected record 1338b, N represents the number of entries 1350 in corobs 1302 associated with records 1338, $AS_i$ represents the values 1308 in the ith entry 1352 of significance vector 1306a, $BS_i$ represents the values 1308 in the ith entry 1352 of significance vector 1306b, $Overlap_{ASi,BSi}$ and $Overlap_{ASi,ASi}$ each represents an overlap between the identified significance values 1308, $Stnd.\ Dist._i$ represents the standard distance between random corobs having the same number of dimensions as the corobs 1202 stored in the ith entry 1350 of corobs 1302, M represents the number of values 1204 in the corobs 1202 stored in the ith entry 1350 of corobs 1302, $A_j$ represents the jth value 1204 of a corob 1202 contained in the ith entry 1350 of corob 1302a, and $B_j$ represents the jth value 1204 of a corob 1202 contained in the ith entry 1350 of corob 1302b. Other relationship indicators may be used without departing from the scope of the present invention.

In this example formula, $AS_i$ represents the values 1308 in the ith entry 1352 of significance vector 1306a. In this embodiment, each of the values 1308 in the ith entry 1352 of significance vector 1306a represent the same value. For this reason, a single variable $AS_i$ may represent multiple values 1308 in an entry 1352 of significance vector 1306a. Similarly, $BS_i$ represents the values 1308 in the ith entry 1352 of significance vector 1306b. In this embodiment, each of the values 1308 in the ith entry 1352 of significance vector 1306b represent the same value, and a single variable $BS_i$ may represent multiple values 1308 in an entry 1352 of significance vector 1306b. In another embodiment, each entry 1352 may contain varying values 1308. In this embodiment, the above formula could be rewritten so that system 100 processes corobs 1302 on a value-by-value basis.

Also in this example formula, $Overlap_{ASi,BSi}$ and $Overlap_{ASi,ASi}$ may be determined in various manners. For example, in one embodiment, $Overlap_{ASi,BSi}$ may be determined by selecting the smaller of the significance values 1308 represented by $AS_i$ and $BS_i$. In this embodiment, $Overlap_{ASi,ASi}$ would equal the value 1308 represented by $AS_i$. In another embodiment, $Overlap_{ASi,BSi}$ may be determined by multiplying the significance values 1308 represented by $AS_i$ and $BS_i$, and $Overlap_{ASi,ASi}$ may be determined by squaring the significance value 1308 represented by $AS_i$. Other methods for determining values for $Overlap_{ASi,BSi}$ and $Overlap_{ASi,ASi}$ may be used without departing from the scope of the present invention.

Although FIG. 13 illustrates corobs 1302 as representing records 1338, corobs 1302 could form at least a part of records 1338. In this embodiment, each record 1338 may comprise one or more corobs 1302 and/or one or more significance vectors 1306. In this embodiment, the tokens forming records 1338 would comprise corobs 1202 contained in entries 1352.

Although FIG. 13 illustrates one example of the corobs 1302 and significance vectors 1306 used to represent records 1338, various changes may be made to corobs 1302 and/or significance vectors 1306 without departing from the scope of the present invention. For example, corobs 1302 and significance vectors 1306 may include any suitable number of entries 1350 and 1352, respectively. Also, each entry 1350 and/or 1352 may include any number of values. Further, while FIG. 13 illustrates one way that corobs 1302 may be used to model records 1338, other modeling techniques using other corobs may be used without departing from the scope of the present invention.

Figure 14:
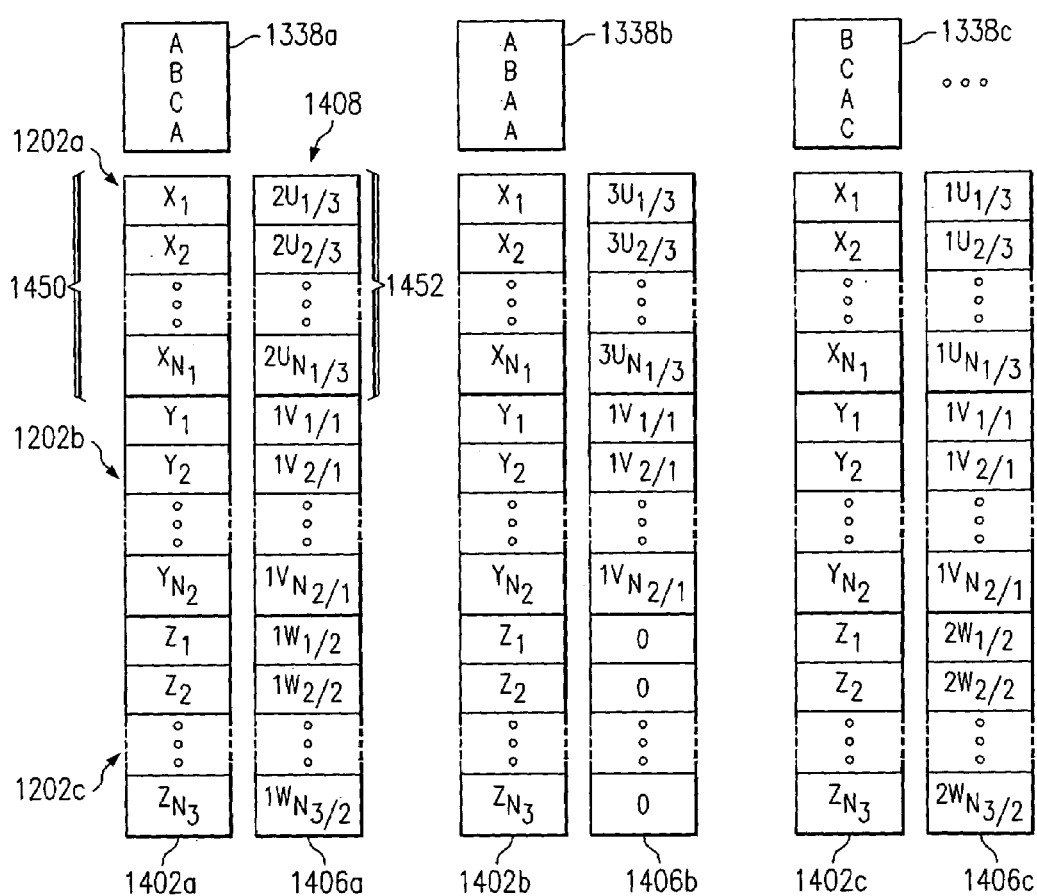
FIG. 14 is a block diagram illustrating another example of the correlithm objects used to represent records in a set of records.

FIG. 14 is a block diagram illustrating another example of the corobs 1402 used to represent records 1338 in a set of records 1338a–1338c. Corobs 1402 may, for example, be generated by corob engine 154 and used by relationship engine 128 to determine the relationship between records 1338. In the illustrated embodiment, each corob 1402 includes at least one entry 1450, and each entry 1450 represents a corob 1202 from token table 1240. Other embodiments of corob 1402 may be used without departing from the scope of the present invention.

In the illustrated embodiment, one entry 1450 in a corob 1402 corresponds to each token 1248 listed in token table 1240. In a particular embodiment, only one entry 1450 in a corob 1402 may be associated with a token 1248. As a result, in this embodiment, the number of entries 1450 in a corob 1402 equals the number of entries 1272 in token table 1240.

Each corob 1402 may also be associated with a significance vector 1406. In the illustrated embodiment, each significance vector 1406 includes at least one entry 1452 containing one or more significance values 1408. Each entry 1452 is associated with a corresponding entry 1450 in corob 1402, and each entry 1450 identifies a token 1248 from token table 1240. As a result, each entry 1452 is associated with a token 1248 from token table 1240.

In a particular embodiment, the values 1408 assigned to an entry 1452 are based on the number of times that a token 1248 associated with entry 1452 appears in a record 1338. For example, the values 1408 in the entry 1452 may be based on the significance vectors 1206 from token table 1240. In this embodiment, a significance vector 1206 from token table 1240 may be scaled in an entry 1452, depending on the number of times that the token 1248 associated with significance vector 1206 appears in a record 1338. System 100 could generate these entries 1452 in significance vectors 1406 using the formula:

$$Entry\ Value_i = \frac{SV_i * Count_{Token}}{Maximum\ Instances_{Token}}$$

where $Entry\ Value_i$ represents the ith value 1408 in an entry 1452, $SV_i$ represents the ith value 1208 in a significance vector 1206 from token table 1240, $Count_{Token}$ represents the number of times that the token 1248 associated with the significance vector 1206 appears in a record 1338, and $Maximum\ Instances_{Token}$ represents the maximum number of times that the token 1248 appears in a single record 1338.

As shown in FIG. 14, record 1338b includes three instances of token "A," and token "A" appears a maximum of three times in a single record 1338. So, the values 1408 in the first entry 1452 of significance vector 1406b are determined by multiplying the values 1208 of significance vector 1206a by (3/3), or 1. In contrast, records 1338a and 1338c include two instances and one instance of token "A," respectively. As a result, the values 1408 in the first entry 1452 of significance vector 1406a are determined by multiplying the values 1208 of significance vector 1206a by (2/3)

or 0.667, and the values 1408 in the first entry 1452 of significance vector 1406c are determined by multiplying the values 1208 of significance vector 1206a by (⅓) or 0.333. Similarly, record 1338b lacks any instance of token "C," so the values 1408 in the third entry 1452 of significance vector 1406b are determined by multiplying the values 1208 of significance vector 1206c by (%), or 0. In this way, the individual significance vectors 1206 may be scaled in significance vector 1406 to represent the count of each token 1248 in a record 1338.

System 100 may use the corobs 1402 and significance vectors 1406 illustrated in FIG. 14 to determine the degree of relationship between records 1338. For example, relationship engine 128 and/or corob engine 154 could determine a relationship indicator involving a target record 1338 and a selected record 1338 using the formula described above with respect to FIG. 13.

Although FIG. 14 illustrates corobs 1402 as representing records 1338, corobs 1402 could form at least a part of records 1338. In this embodiment, each record 1338 may comprise one or more corobs 1402 and/or one or more significance vectors 1406. In this embodiment, the tokens forming records 1338 would comprise corobs 1202 contained in entries 1452.

Although FIG. 14 illustrates another example of the corobs 1402 and significance vectors 1406 used to represent records 1338, various changes may be made to corobs 1402 and/or significance vectors 1406 without departing from the scope of the present invention. For example, corobs 1402 and significance vectors 1406 may include any suitable number of entries 1450 and 1452, respectively. Also, each entry 1450 and/or 1452 may include any number of values. Further, while FIG. 14 illustrates one way that corobs 1402 may be used to model records 1338, other modeling techniques using other corobs may be used without departing from the scope of the present invention.

FIG. 15 is a block diagram illustrating another example system 1500 for identifying relationships between database records 1538. In the illustrated embodiment, system 1500 includes an input device 1508, an output device 1510, random access memory (RAM) 1512, read-only memory (ROM) 1514, a CD-ROM, hard drive, and/or other magnetic, optical, or other storage media 1516 or other appropriate volatile or nonvolatile storage and retrieval devices, and one or more processors 1518. Other embodiments of system 1500 may be used without departing from the scope of the present invention. Also, although FIG. 15 illustrates memory 1532 as residing within system 1500, memory 1532 may reside at any location that is accessible by system 1500.

Items within the dashed lines in FIG. 15 represent example functional operation and data organization of the various components of system 1500. In the illustrated embodiment, system 1500 includes a corob engine 1548 and a memory 1532. Corob engine 1548 supports the use of corobs in system 1500. Corob engine 1548 may, for example, support one or more algorithms for creating, processing, and manipulating corobs. Corob engine 1548 may include any hardware, software, firmware, or combination thereof operable to support the use of corobs in system 1500. Corob engine 1548 may, for example, include software routines executing on processor 1518.

Memory 1532 stores information used by one or more components of system 1500. In the illustrated embodiment, memory 1532 includes a plurality of cells 1550a–1550j (referred to collectively as cells 1550). Each cell 1550 may receive one or more input values 1552, which may be stored in an input corob 1554. For example, cell 1550d may receive one or more input values 1552 from cell 1550a, one or more input values 1552 from cell 1550b, and one or more input values 1552 from cell 1550c. These input values 1552 may be combined to form an input corob 1554, which may be stored in a register 1556 or other device.

After a cell 1550 receives one or more input values 1552, a controller 1558 may receive the input corob 1554 from register 1556 and access an input-output table 1560. In one embodiment, table 1560 identifies a plurality of corobs 1562 and an output value 1564 associated with each corob 1562. An output value 1564 may represent a single value, a group of values, a corob, or any other suitable information. In a particular embodiment, when controller 1558 receives an input corob 1554 from register 1556, controller 1558 attempts to determine whether the input corob 1554 matches a corob 1562 in table 1560. If a corob 1562 in table 1560 matches the input corob 1554, controller 1558 may place the output value 1564 associated with the matching corob 1562 in an output register 1566. The output value 1564 stored in register 1566 may then be communicated to another cell 1550 or other component in system 1500.

In one embodiment, if the input corob 1554 does not match any of the corobs 1562 in table 1560, controller 1558 may attempt to identify which corob 1562 in table 1560 is most similar to the input corob 1554. After identifying the corob 1562 that is most similar to input corob 1554, controller 1558 may store the output value 1564 associated with the identified corob 1562 in output register 1566. In another embodiment, controller 1558 may identify multiple corobs 1562 in table 1560 that are similar to the input corob 1554, and controller 1558 may combine the output values 1564 associated with those corobs 1562 to produce the output value 1564 stored in output register 1566. For example, controller 1558 could scale the output value 1564 associated with each corob 1562 that is similar to input corob 1554 by a varying amount, based on how similar that corob 1562 is to the input corob 1554. Controller 1558 could generate output values 1564 in any other suitable manner without departing from the scope of the present invention.

In one embodiment, when controller 1558 compares an input corob 1554 to the corobs 1562 in table 1560, controller 1558 determines a relationship indicator for each corob 1562. In a particular embodiment, system 1500 may view the input corob 1554 as the only token in a record, and system 1500 may view each corob 1562 as the only token in other records. As a result, when system 1500 compares two corobs, system 1500 is comparing two records that each includes one token. In this particular embodiment, controller 1558 may determine the relationship indicators using the formula:

$$\text{Relationship Indicator} = \frac{\sum_{i=1}^{N} \left( Overlap_{AS_i, BS_i} * \left( \left(\frac{1}{6} - (A_i - B_i)\right)^2 \right) \right)}{\sum_{i=1}^{N} \left( Overlap_{AS_i, AS_i} * \frac{1}{6} \right)}$$

where N represents a number of values 1552 in the corob 1554, $AS_i$ represents the ith significance value in a significance vector associated with corob 1554, $BS_i$ represents the ith significance value in a significance vector associated with corob 1562, $Overlap_{AS_i,BS_i}$ and $Overlap_{AS_i,AS_i}$ each represents an overlap of the identified significance values, $A_i$ represents the ith value 1552 of corob 1554, and $B_i$ represents the ith value of corob 1562. This formula is similar to the formula described above with respect to FIG. 13. In particular, the variable Stnd. Dist._i from the formula above has been replaced by ⅙, which represents the squared standard distance between corobs existing in one dimension. Other relationship indicators may be used without departing from the scope of the present invention.

Controller 1558 may use the relationship indicators to identify one or more corobs 1562 in table 1560 that are similar to input corob 1554. For example, if an input corob 1554 matches a corob 1562, the relationship indicator for that corob 1562 may equal 1.0. an input corob 1554 is very similar to a corob 1562, the relationship indicator for that corob 1562 may lie near 1.0. If an input corob 1554 is very dissimilar to a corob 1562, the relationship indicator for that corob 1562 may lie near 0.0. Using the relationship indicators, controller 1558 may then take any suitable action. For example, if one of the relationship indicators indicates an exact match, the input corob 1554 matches a corob 1562 in table 1560, and controller 1558 may store the output value 1564 associated with that corob 1562 to output register 1566. If no exact matches are found, controller 1558 can use the relationship indicators to scale various output values 1564 from table 1560, combine the scaled output values 1564, and store the resulting value in output register 1566.

Input register 1554, table 1560, and output register 1566 may include any hardware, software, firmware, or combination thereof operable to store and facilitate retrieval of information. Controller 1558 may include any hardware, software, firmware, or combination thereof operable to receive an input corob 1554 and generate and/or identify an output value 1564.

Although FIG. 15 illustrates one embodiment of system 1500, various changes may be made to system 1500 without departing from the scope of the present invention. For example, the functional divisions of system 1500 are for illustration only. Various functional components of system 1500 could be combined with one another or removed from system 1500, depending on particular needs, without departing from the scope of the present invention.

Although the present invention has been described with several embodiments, a number of changes, substitutions, variations, alterations, and modifications may be suggested to one skilled in the art, and it is intended that the invention encompass all such changes, substitutions, variations, alterations, and modifications that fall within the spirit and scope of the appended claims.

What is claimed is:

1. A method for identifying relationships between database records, comprising:
   selecting a first record in a plurality of records, each record comprising at least one of a plurality of tokens, wherein selecting the first record comprises submitting a synthetic document to a server that the server may use to generate the first record; and
   wherein the server is operable to:
   compare the first record to at least one other of the plurality of records; and
   determine at least one relationship indicator based on the comparison and at least one of a plurality of weights associated with the tokens, the at least one relationship indicator identifying a level of relationship between the first record and at least one other record.

2. A method for identifying relationships between database records, comprising:
   storing a first correlithm object and second correlithm object, the first and second correlithm objects each comprising a plurality of first entries, each first entry comprising one or more values;
   storing a first significance vector and a second significance vector, the first and second significance vectors each comprising a plurality of second entries, each second entry comprising one or more significance values; and
   determining a relationship indicator associated with the first and second correlithm objects, the relationship indicator determined using a formula of:

$$\text{Relationship Indicator} = \frac{\sum_{i=1}^{N}\left(Overlap_{AS_i,BS_i} * \left(Stnd.\,Dist._i^2 - \sum_{j=1}^{M}(A_j - B_j)^2\right)\right)}{\sum_{i=1}^{N}\left(Overlap_{AS_i,AS_i} * Stnd.\,Dist._i^2\right)}$$

where N represents a number of first entries in the first and second correlithm objects, $AS_i$ represents the significance values in the ith second entry of the first significance vector, $BS_i$ represents the significance values in the ith second entry of the second significance vector, $Overlap_{ASi,BSi}$ and $Overlap_{ASi,ASi}$ each represents one of a minimum and a product of the identified significance values, Stnd. Dist._i represents a standard distance associated with the ith first entries of the first and second correlithm objects, M represents a number of values in the ith first entry of the first and second correlithm objects, $A_j$ represents the jth value in the ith first entry of the first correlithm object, and $B_j$ represents the jth value in the ith first entry of the second correlithm object.

3. A method for identifying relationships between database records, comprising:
   storing a first correlithm object and a first significance vector, the first correlithm object comprising a plurality of first values, the first significance vector comprising a plurality of first significance values;
   storing a second correlithm object and a second significance vector, the second correlithm object comprising a plurality of second values, the second significance vector comprising a plurality of second significance values;
   determining a relationship indicator associated with the first and second correlithm objects, the relationship indicator determined using a formula of:

$$\text{Relationship Indicator} = \frac{\sum_{i=1}^{N}\left(Overlap_{AS_i,BS_i} * \left(\frac{1}{6} - (A_i - B_i)\right)^2\right)}{\sum_{i=1}^{N}\left(Overlap_{AS_i,AS_i} * \frac{1}{6}\right)}$$

where N represents a number of first and second values in the first and second correlithm objects, $AS_i$ represents the ith first significance value in the first significance vector, $BS_i$ represents the ith second significance value in the second significance vector, $Overlap_{ASi,BSi}$ and $Overlap_{ASi,ASi}$ each represents one of a minimum and a product of the identified significance values, $A_i$ represents the ith first value of the first correlithm object, and $B_i$ represents the ith second value of the second correlithm object.

4. A system for identifying relationships between database records, comprising:
a memory operable to store:
a token table containing each of a plurality of tokens, a token representation associated with each token, and a weight associated with each token;
a records table containing one or more token representations associated with one or more tokens contained in each of a first record and a second record, the records table also identifying a number of times that the one or more tokens appear in each record; and
a records table index containing a location in the records table associated with each record and a record score associated with each record; and
one or more processors collectively operable to:
identify the one or more token representations associated with the first record and the one or more token representations associated with the second record using the records table index and the records table; and
determine a relationship indicator associated with the second record using the identified token representations, the record score associated with the first record, and at least one of the weights associated with the token representations, the at least one relationship indicator identifying a level of relationship between the first record and at least one second record.

5. The system of claim 4, wherein the weight associated with one of the tokens is determined using a formula of:

$$Weight = -\log\left(\frac{Count_{Token}}{Total_{Token}}\right)$$

where $COUNT_{Token}$ represents the number of times that the token appears in the plurality of records, and $Total_{Tokens}$ represents the number of times that all tokens appear in the plurality of records.

6. The system of claim 4, wherein the record score associated with the first record is determined using a formula of:

$$\text{Record Score} = \sum_{i=1}^{k} (Weight_{Token\ k} * Count_{Token\ k})$$

where k represents a number of unique tokens associated with the first record, $Weight_{Token\ k}$ represents the weight associated with the kth unique token, and $Count_{Token\ k}$ represents a number of times that the kth unique token appears in the first record.

7. The system of claim 4, wherein the one or more processors are further collectively operable to:
identify any common tokens, a common token comprising one of the tokens that appears in both the first record and the second record; and
identify a common count value for each common token, the common count value representing a minimum number of times that the common token appears in either the first record or the second record.

8. The system of claim 7, wherein the relationship indicator associated with the second record when compared to the first record is determined using a formula of:

$$\text{Relationship Indicator} = \frac{\sum_{i=1}^{j}\left(\begin{array}{c}Weight_{Token\ i} *\\ \text{Common } Count_{Token\ i}\end{array}\right)}{Score_{Target\ Record}}$$

where j represents a number of common tokens, $Weight_{Token\ i}$ represents the weight associated with the ith common token, Common $Count_{Token\ i}$ represents the common count value associated with the ith common token, and $Score_{First\ record}$ represents the record score associated with the first record.

9. The system of claim 4, wherein:
a plurality of second records are each associated with at least one document;
the one or more processors are collectively operable to determine a plurality of relationship indicators associated with the plurality of second records; and
the one or more processors are further collectively operable to:
select one or more of the second records based on the relationship indicators; and
make the documents associated with the one or more second records available to a user.

10. The system of claim 4, wherein the one or more processors are collectively operable to allow a user to select the first record, wherein selecting the first record comprises at least one of selecting one of the plurality of records and submitting a document that the one or more processors may use to generate the first record.

11. The system of claim 4, wherein the one or more processors are further collectively operable to:
receive a query from a user;
identify one or more records that satisfy the query;
identify one or more documents associated with the one or more records; and
make the one or more documents available to the user.

12. The system of claim 4, wherein:
a first correlithm object and a first significance vector are associated with each of the tokens, each first correlithm object comprising a plurality of values defining a first point in a particular space, the particular space defined by a plurality of dimensions and including a plurality of points; and
a second correlithm object and a second significance vector are associated with each of the first record and the second record, each second correlithm object comprising at least one of the first correlithm objects.

13. The system of claim 12, wherein:
a distance between one of the first points and each of the plurality of points in one of the particular spaces defines a distribution having a standard deviation; and
a number of values in one of the first correlithm objects associated with one of the tokens may be determined using a formula of:

Number of Values=[$Weight_{Token}$*Standard Deviation]

where $Weight_{Token}$ represents the weight associated with the token, and Standard Deviation represents the standard deviation of the distribution.

14. The system of claim 13, wherein one of the first significance vectors comprises a plurality of significance values, each significance value determined using a formula of:

$$\text{Significance Value} = \frac{Weight_{Token} * \text{Standard Deviation}}{\text{Number of Values}}.$$

15. The system of claim 12, wherein:
the second correlithm object comprises one or more first entries and the second significance vector comprises one or more second entries, at least one first entry comprising one of the first correlithm objects; and
each first entry in the second correlithm objects is associated with an instance of one of the tokens.

16. The system of claim 12, wherein:
the second correlithm object comprises one or more first entries and the second significance vector comprises one or more second entries, at least one first entry comprising one of the first correlithm objects; and
each first entry in the second correlithm objects is associated with one of the unique tokens.

17. The system of claim 12, wherein:
the second correlithm object comprises one or more first entries and the second significance vector comprises one or more second entries, at least one first entry comprising one of the first correlithm objects;
each first entry in the second correlithm object is also associated with one second entry in the second significance vector;
the relationship indicator associated with the second record when compared to the first record is determined using a formula of:

Relationship Indicator =

$$\frac{\sum_{i=1}^{N}\left(\text{Overlap}_{AS_i,BS_i} * \left(\text{Stnd. Dist.}_i^2 - \sum_{j=1}^{M}(A_j - B_j)^2\right)\right)}{\sum_{i=1}^{N}\left(\text{Overlap}_{AS_i,AS_i} * \text{Stnd. Dist.}_i^2\right)}$$

where N represents the number of first entries in the second correlithm objects and the number of second entries in the second significance vectors, $AS_i$ represents significance values in the ith second entry of the second significance vector associated with the first record, $BS_i$ represents significance values in the ith second entry of the second significance vector associated with the second record, $\text{Overlap}_{AS_i,BS_i}$ and $\text{Overlap}_{AS_i,AS_i}$ each represents an overlap value between the identified significance values in the second significance vectors, Stnd. Dist.$_i$ represents a standard distance associated with the first correlithm objects contained in the ith first entries of the second correlithm objects, M represents the number of values in the first correlithm objects contained in the ith first entries of the second correlithm objects, $A_j$ represents the jth value of the first correlithm object contained in the ith first entry of the second correlithm object associated with the first record, and $B_j$ represents the jth value of the first correlithm object contained in the ith first entry of the second correlithm object associated with the second record; and
wherein $\text{Overlap}_{AS_i,BS_i}$ and $\text{Overlap}_{AS_i,AS_i}$ each comprises one of a minimum of the identified significance values in the second significance vectors and a product of the identified significance values in the second significance vectors.

18. The system of claim 4, wherein:
at least one token comprises a first correlithm object; and
at least one of the records comprises a second correlithm object, the second correlithm object comprising at least one of the first correlithm objects.

19. A method for identifying relationships between database records, comprising:
identifying one or more token representations associated with a first record and one or more token representations associated with a second record using a records table index and a records table, the records table containing the one or more token representations associated with one or more tokens contained in each of the records, the records table also identifying a number of times that the one or more tokens appear in each record, the records table index containing a location in the records table associated with each record and a record score associated with each record; and
determining a relationship indicator associated with the second record using the identified token representations, the record score associated with the first record, and at least one of a plurality of weights associated with the token representations, the at least one relationship indicator identifying a level of relationship between the first record and at least one second record.

20. The method of claim 19, wherein the weight associated with one of the tokens is determined using a formula of:

$$\text{Weight} = -\log\left(\frac{Count_{Token}}{Total_{Token}}\right)$$

where $Count_{Token}$ represents the number of times that the token appears in the plurality of records, and $Total_{Tokens}$ represents the number of times that all tokens appear in the plurality of records.

21. The method of claim 19, wherein the record score associated with the first record is determined using a formula of:

$$\text{Record Score} = \sum_{i=1}^{k}(Weight_{Token\ k} * Count_{Token\ k})$$

where k represents a number of unique tokens associated with the first record, $Weight_{Token\ k}$ represents the weight associated with the kth unique token, and $Count_{Token\ k}$ represents a number of times that the kth unique token appears in the first record.

22. The method of claim 19, further comprising:
identifying any common tokens, a common token comprising one of the tokens that appears in both the first record and the second record; and
identifying a common count value for each common token, the common count value representing a minimum number of times that the common token appears in either the first record or the second record.

23. The method of claim 22, wherein the relationship indicator associated with the second record when compared to the first record is determined using a formula of:

$$\text{Relationship Indicator} = \frac{\sum_{i=1}^{j}\left(\begin{array}{c}\text{Weight}_{\text{Token } i} * \\ \text{Common Count}_{\text{Token } i}\end{array}\right)}{\text{Score}_{\text{Target Record}}}$$

where j represents a number of common tokens, $\text{Weight}_{\text{Token } i}$ represents the weight associated with the ith common token, $\text{Common Count}_{\text{Token } i}$ represents the common count value associated with the ith common token, and $\text{Score}_{\text{First record}}$ represents the record score associated with the first record.

24. The method of claim 19, wherein:
a plurality of second records are each associated with at least one document;
a plurality of relationship indicators associated with the plurality of second records are determined; and
further comprising:
  selecting one or more of the second records based on the relationship indicators; and
  making the documents associated with the one or more second records available to a user.

25. The method of claim 19, wherein:
a first correlithm object and a first significance vector are associated with each of the tokens, each first correlithm object comprising a plurality of values defining a first point in a particular space, the particular space defined by a plurality of dimensions and including a plurality of points; and
a second correlithm object and a second significance vector are associated with each of the first record and the second record, each second correlithm object comprising at least one of the first correlithm objects.

26. The method of claim 25, wherein:
a distance between one of the first points and each of the plurality of points in one of the particular spaces defines a distribution having a standard deviation;
a number of values in one of the first correlithm objects associated with one of the tokens may be determined using a formula of:

Number of Values = [$\text{Weight}_{\text{Token}}$ * Standard Deviation]

where $\text{Weight}_{\text{Token}}$ represents the weight associated with the token, and Standard Deviation represents the standard deviation of the distribution; and
one of the first significance vectors comprises a plurality of significance values, each significance value determined using a formula of:

$$\text{Significance Value} = \frac{\text{Weight}_{\text{Token}} * \text{Standard Deviation}}{\text{Number of Values}}.$$

27. The method of claim 25, wherein:
the second correlithm object comprises one or more first entries and the second significance vector comprises one or more second entries, at least one first entry comprising one of the first correlithm objects; and
each first entry in the second correlithm objects is associated with an instance of one of the tokens.

28. The method of claim 25, wherein:
the second correlithm object comprises one or more first entries and the second significance vector comprises one or more second entries, at least one first entry comprising one of the first correlithm objects; and
each first entry in the second correlithm objects is associated with one of the unique tokens.

29. The method of claim 25, wherein:
the second correlithm object comprises one or more first entries and the second significance vector comprises one or more second entries, at least one first entry comprising one of the first correlithm objects;
each first entry in the second correlithm object is also associated with one second entry in the second significance vector;
the relationship indicator associated with the second record when compared to the first record is determined using a formula of:

$$\text{Relationship Indicator} = \frac{\sum_{i=1}^{N}\left(\left(\text{Stnd. Dist.}_i^2 - \sum_{j=1}^{M}(A_j - B_j)^2\right)\frac{\text{Overlap}_{AS_i,BS_i} *}{}\right)}{\sum_{i=1}^{N}\left(\text{Overlap}_{AS_i,AS_i} * \text{Stnd. Dist.}_i^2\right)}$$

where N represents the number of first entries in the second correlithm objects and the number of second entries in the second significance vectors, $AS_i$ represents significance values in the ith second entry of the second significance vector associated with the first record, $BS_i$ represents significance values in the ith second entry of the second significance vector associated with the second record, $\text{Overlap}_{AS_i,BS_i}$ and $\text{Overlap}_{AS_i,AS_i}$ each represents an overlap value between the identified significance values in the second significance vectors, $\text{Stnd. Dist.}_i$ represents a standard distance associated with the first correlithm objects contained in the ith first entries of the second correlithm objects, M represents the number of values in the first correlithm objects contained in the ith first entries of the second correlithm objects, $A_j$ represents the jth value of the first correlithm object contained in the ith first entry of the second correlithm object associated with the first record, and $B_j$ represents the jth value of the first correlithm object contained in the ith first entry of the second correlithm object associated with the second record; and
wherein $\text{Overlap}_{AS_i,BS_i}$ and $\text{Overlap}_{AS_i,AS_i}$ each comprises one of a minimum of the identified significance values in the second significance vectors and a product of the identified significance values in the second significance vectors.

30. The method of claim 19, wherein:
at least one token comprises a first correlithm object; and
at least one of the records comprises a second correlithm object, the second correlithm object comprising at least one of the first correlithm objects.

31. Software for identifying relationships between database records, the software embodied on at least one computer readable medium and operable when executed to:
identify one or more token representations associated with a first record and one or more token representations associated with a second record using a records table index and a records table, the records table containing the one or more token representations associated with one or more tokens contained in each of the records, the records table also identifying a number of times that the one or more tokens appear in each record, the records table index containing a location in the records table associated with each record and a record score associated with each record; and determine a relationship indicator associated with the second record using the identified token representations, the record score associated with the first record, and at least one of a plurality of weights associated with the token representations, the at least one relationship indicator identifying a level of relationship between the first record and at least one second record.

32. A system for identifying relationships between database records, comprising:

means for identifying one or more token representations associated with a first record and one or more token representations associated with a second record using a records table index and a records table, the records table containing the one or more token representations associated with one or more tokens contained in each of the records, the records table also identifying a number of times that the one or more tokens appear in each record, the records table index containing a location in the records table associated with each record and a record score associated with each record; and means for determining a relationship indicator associated with the second record using the identified token representations, the record score associated with the first record, and at least one of a plurality of weights associated with the token representations, the at least one relationship indicator identifying a level of relationship between the first record and at least one second record.

* * * * *